US011625349B1

(12) United States Patent
Randall et al.

(10) Patent No.: US 11,625,349 B1
(45) Date of Patent: Apr. 11, 2023

(54) APPARATUS AND METHOD FOR MANAGING PREFETCH TRANSACTIONS

(71) Applicant: Arm Limited, Cambridge (GB)

(72) Inventors: Joshua Randall, Austin, TX (US); Alexander Cole Shulyak, Austin, TX (US); Jose Alberto Joao, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/529,768

(22) Filed: Nov. 18, 2021

(51) Int. Cl.
*G06F 9/38* (2018.01)
*G06F 13/36* (2006.01)

(52) U.S. Cl.
CPC ............ *G06F 13/36* (2013.01); *G06F 9/3802* (2013.01)

(58) Field of Classification Search
None
See application file for complete search history.

(56) References Cited

U.S. PATENT DOCUMENTS

| | | | | |
|---|---|---|---|---|
| 7,200,116 | B2* | 4/2007 | Kobayashi | H04L 45/22 370/236 |
| 9,294,403 | B2* | 3/2016 | Mejia | H04L 47/12 |
| 2007/0047446 | A1* | 3/2007 | Dalal | H04L 45/22 370/237 |
| 2012/0170582 | A1* | 7/2012 | Abts | H04L 45/06 370/392 |
| 2016/0050152 | A1* | 2/2016 | Sung | H04L 45/22 370/235 |
| 2019/0104054 | A1* | 4/2019 | McDonald | H04L 45/122 |

OTHER PUBLICATIONS

Nachiappan, et al., "Application-aware Prefetch Prioritization in On-chip Networks", PACT '12, Sep. 19-23, 2012, Minneapolis, Minnesota, USA, pp. 441-442 (2 pp.).

(Continued)

*Primary Examiner* — Elias Mamo
(74) *Attorney, Agent, or Firm* — Nixon & Vanderhye P.C.

(57) ABSTRACT

An apparatus and method are provided for managing prefetch transactions. The apparatus has an interconnect for providing communication paths between elements coupled to the interconnect. The elements coupled to the interconnect comprise at least a requester element to initiate transactions, and a plurality of completer elements each of which is arranged to respond to a transaction received by that completer element. Congestion tracking circuitry maintains, in association with the requester element, a congestion indication for each of a plurality of routes through the interconnect used to propagate transactions initiated by that requester element. Each route comprises one or more communication paths, and the route employed to propagate a given transaction is dependent on a target completer element for that transaction. Prefetch throttling circuitry then identifies, in response to an indication of a given prefetch transaction that the requester element wishes to initiate, the target completer element amongst the plurality of completer elements to which that given prefetch transaction would be issued. It then determines whether to issue the given prefetch transaction in dependence on the congestion indication for the route that has been determined.

27 Claims, 15 Drawing Sheets

(56) References Cited

OTHER PUBLICATIONS

Gratz, et al., "Regional Congestion Awareness for Load Balance in Networks-on-Chip", downloaded on Sep. 23, 2021, UTC from IEEE Xplore, pp. 203-214 (12 pp.).

Chen, et al., "Link-Sharing: Regional Congestion Aware Routing in 2D NoC by Propagating Congestion Information on Idle Links", 2018 $3^{rd}$ International Conference on Integrated Circuits and Microsystems, downloaded on Sep. 23, 2021, UTC from IEEE Xplore, pp. 291-297 (7 pp.).

Aziz, et al., "Balanced Prefetching Aggressiveness Controller for NoC-based Mutliprocessor", SBCCI ' 14, Sep. 1-5, 2014, Aracaju, Brazil, 7pp., URL: http://dx.doi.org/10.1145/2660540.2660541.

Escamilla, et al., "ICARO: Congestion Isolation in Networks-On-Chip", Downloaded on Sep. 23, 2021, UTC from IEEE Xplore, 2014 Eighth IEEE/ACM International Symposium on Networks-on-Chip (NoCS), pp. 159-166 (8pp.).

\* cited by examiner

APPARATUS AND METHOD FOR MANAGING PREFETCH TRANSACTIONS

BACKGROUND

The present technique relates to an apparatus and method for managing prefetch transactions.

Often, processing devices (for example processor cores) have one or more levels of local cache in which data can be temporarily held in order to seek to improve performance, by avoiding the need to obtain such data from memory. In modern processing devices, prefetch mechanisms may be provided to seek to prefetch into the local cache(s) data in anticipation of subsequent use of that data by the processing device. Whilst such an approach can significantly improve performance by increasing the hit ratio in the local cache(s) in the event that useful data is prefetched into the cache(s), the various prefetch transactions issued in order to retrieve the data into the cache(s) can consume significant bandwidth within downstream components of the system, such as an interconnect used to couple the processing device with memory.

An interconnect can be used to provide connections between multiple different elements within a system, and congestion within one or more of the communication paths through the interconnect can hence significantly impact system performance.

SUMMARY

In one example arrangement, there is provided an apparatus comprising: an interconnect to provide communication paths between elements coupled to the interconnect; wherein the elements coupled to the interconnect comprise at least a requester element to initiate transactions through the interconnect, and a plurality of completer elements each of which is arranged to respond to a transaction received by that completer element via the interconnect; the apparatus further comprising: congestion tracking circuitry to maintain, in association with the requester element, a congestion indication for each of a plurality of routes through the interconnect used to propagate transactions initiated by the requester element, where each route comprises one or more communication paths and the route employed to propagate a given transaction is dependent on a target completer element for that given transaction; and prefetch throttling circuitry, responsive to an indication of a given prefetch transaction that the requester element wishes to initiate in order to speculatively retrieve data in anticipation of subsequent use of that data by the requester element, to identify the target completer element amongst the plurality of completer elements to which that given prefetch transaction would be issued, and to determine whether to issue the given prefetch transaction in dependence on the congestion indication for the route to be used to propagate that given prefetch transaction given the target completer element.

In another example arrangement, there is provided a method of managing prefetch transactions, comprising: providing communication paths between elements coupled to an interconnect, wherein the elements coupled to the interconnect comprise at least a requester element to initiate transactions through the interconnect, and a plurality of completer elements each of which is arranged to respond to a transaction received by that completer element via the interconnect; maintaining, in association with the requester element, a congestion indication for each of a plurality of routes through the interconnect used to propagate transactions initiated by the requester element, where each route comprises one or more communication paths and the route employed to propagate a given transaction is dependent on a target completer element for that given transaction; identifying, in response to an indication of a given prefetch transaction that the requester element wishes to initiate in order to speculatively retrieve data in anticipation of subsequent use of that data by the requester element, the target completer element amongst the plurality of completer elements to which that given prefetch transaction would be issued; and determining whether to issue the given prefetch transaction in dependence on the congestion indication for the route to be used to propagate that given prefetch transaction given the target completer element.

In a still further example arrangement, there is provided a non-transitory computer-readable medium to store computer-readable code for fabrication of an apparatus comprising: an interconnect to provide communication paths between elements coupled to the interconnect, wherein the elements coupled to the interconnect comprise at least a requester element to initiate transactions through the interconnect, and a plurality of completer elements each of which is arranged to respond to a transaction received by that completer element via the interconnect; congestion tracking circuitry to maintain, in association with the requester element, a congestion indication for each of a plurality of routes through the interconnect used to propagate transactions initiated by the requester element, where each route comprises one or more communication paths and the route employed to propagate a given transaction is dependent on a target completer element for that given transaction; and prefetch throttling circuitry, responsive to an indication of a given prefetch transaction that the requester element wishes to initiate in order to speculatively retrieve data in anticipation of subsequent use of that data by the requester element, to identify the target completer element amongst the plurality of completer elements to which that given prefetch transaction would be issued, and to determine whether to issue the given prefetch transaction in dependence on the congestion indication for the route to be used to propagate that given prefetch transaction given the target completer element.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
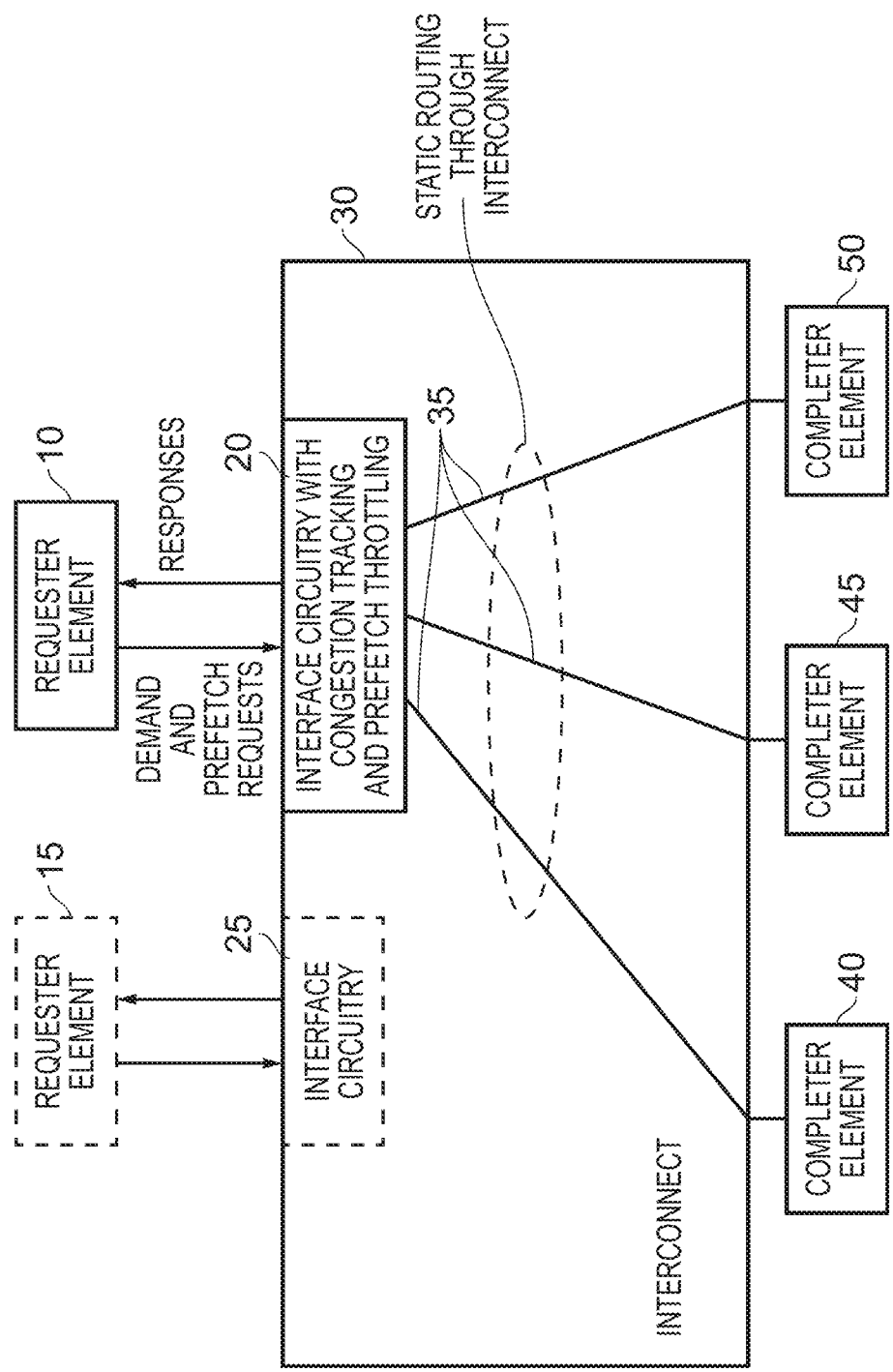
FIG. 1 is a block diagram of a system in accordance with one example implementation.

In one example implementation an apparatus is provided that has an interconnect for providing communication paths between elements coupled to the interconnect. The interconnect may be arranged to employ a routing scheme to determine the communication path or communication paths used for any particular communication that needs transferring over the interconnect. For instance, the routing scheme may be a dynamic/adaptive routing scheme that allows some flexibility in routing, for example to seek to avoid congestion. However, in one example implementation, the interconnect employs a static routing scheme such that a same communication path is used whenever a first given element communicates with a second given element via the interconnect. It should be noted that the static routing scheme may employ different communication paths dependent on the direction of the communication. Hence, whilst there may be one communication path used when the first given element sends a communication to the second given element, a different communication path may be used when the second given element sends a communication to the first given element.

The elements coupled to the interconnect can take a variety of forms, but in accordance with the techniques described herein the elements comprise at least a requester element to initiate transactions through the interconnect, and a plurality of completer elements each of which is arranged to respond to a transaction received by that completer element via the interconnect. Whilst the techniques described herein are applicable even if there is only a single requester element coupled to the interconnect, it will be appreciated that in many systems there will be multiple requester elements, and the techniques described herein can be used in association with any or all of those requester elements. Further, the completer elements can take a variety of forms. For example, they can be slave components such as a memory controller used to control access to memory, but can also be intermediate elements, for example a system cache/associated control circuitry, which, in response to a transaction, may perform a lookup to determine whether the data that is seeking to be accessed is already stored within the system cache or not. In the event of a hit, the transaction may be serviced directly by that intermediate element, but in the event of a miss that intermediate element may propagate the transaction on to a further completer element, for example a memory controller.

The apparatus further comprises congestion tracking circuitry to maintain, in association with the requester element, a congestion indication for each of a plurality of routes through the interconnect that may be used to propagate transactions initiated by the requester element. Each route comprises one or more communication paths, and the route employed to propagate a given transaction is dependent on the target completer element for that given transaction. If desired, one or more of the routes for which a congestion indication is maintained may relate to single communication paths between a pair of elements coupled to the interconnect. However, alternatively, or in addition, one or more of the routes may relate to round trip routes emanating from the requester element and returning to the requester element, for example a round trip route from the requester element to a completer element, and then back to the requester element. Such round trip routes will typically comprise multiple communication paths.

As mentioned earlier, congestion can be a significant issue in modern interconnects, and often certain paths through the interconnect are more congested than others. By use of the congestion tracking circuitry discussed above, it is possible to maintain information indicative of the congestion associated with a number of the routes that may be employed when propagating transactions that are initiated by the requester element. It has been found that this can be useful when managing prefetch transactions issued by such a requester element.

In particular, modern processing devices can often use aggressive prefetching to try to increase performance, but the prefetching often does not have perfect accuracy, which can lead to certain prefetched data not being used. Further, due to the nature of prefetch transactions, there is no requirement for those prefetch transactions to be carried out, as correct operation is still guaranteed, albeit with a potential drop in performance if the processing device has to access from memory data that could have been prefetched into its local cache earlier by handling a prefetch transaction.

In accordance with the techniques described herein, by maintaining congestion indications for all or at least some of the routes used to propagate transactions initiated by the requester element, a mechanism can be provided for throttling a given prefetch transaction in the presence of congestion within the relevant route through the interconnect that would be used for handling that prefetch transaction. In particular, the apparatus further comprises prefetch throttling circuitry that is arranged, in response to an indication of a given prefetch transaction that the requester element wishes to initiate in order to speculatively retrieve data in anticipation of subsequent use of that data by the requester element, to identify the target completer element amongst the plurality of completer elements to which that given prefetch transaction would be issued. The prefetch throttling circuitry then determines whether to issue the given prefetch transaction in dependence on the congestion indication for the route to be used to propagate that given prefetch transaction given the target completer element.

By such an approach, it is possible to selectively drop certain prefetch transactions dependent on the congestion that is associated with the route that would need to be used to propagate that prefetch transaction through the interconnect. By such an approach, prefetch transactions can be managed so as to adaptively seek to avoid oversubscribing bottlenecks within the interconnect. It should be noted that whilst this technique can be highly beneficial in interconnects that employ static routing schemes, and hence where there is no choice as to the communication path that needs to be used when communicating from a first given element to a second given element, it can also give rise to significant benefits when used within an interconnect that employs a dynamic/adaptive routing scheme. In particular, whilst dynamic/adaptive routing may help alleviate congestion, it may in some instances not be able to sufficiently reduce congestion, and in such instances the use of the above technique can be beneficial. For example, such a dynamic/adaptive routing scheme may be able to pick the least congested route from a number of options available for communication between a particular pair of elements, but it may be that that route is still significantly congested. If such a situation is expected between a specific pair of elements regardless of the route taken, then use of the above described technique can be used to selectively drop certain prefetch requests.

In one example implementation, the requester element may be arranged to provide a confidence indication in association with each prefetch transaction that the requester element wishes to initiate, the confidence indication being indicative of a likelihood of the data associated with that prefetch transaction subsequently being used by the requester element. The prefetch throttling circuitry may then be arranged to determine whether to issue the given prefetch transaction taking into account both the congestion indication for the route to be used to propagate the given prefetch transaction, and the confidence indication associated with the given prefetch transaction. By such a mechanism, the extent to which prefetch transactions are throttled may depend not only on the route congestion but also an indication of the likelihood that that data will be useful to the requester element. Hence, by way of example, a particular level of congestion associated with the route to be used for a prefetch transaction may be sufficient to cause a low confidence prefetch transaction to be dropped, whilst a higher confidence prefetch transaction may still be issued over that route.

In one example implementation, the prefetch throttling circuitry is arranged upon determining that the given prefetch transaction should not be issued, to issue a signal to the requester element to identify that the given prefetch transaction has been rejected. It can be useful to explicitly signal to the requester element if a prefetch transaction is being rejected, as that can, for example, avoid potential race conditions arising. However, in alternative designs, it may be appropriate to allow rejected prefetch transactions to silently fail, if there is no requirement to notify the requester element.

There are a number of ways in which the target completer elements can be identified for the given prefetch transaction. However, in one example implementation, the indication of the given prefetch transaction that the requester element wishes to initiate provides a memory address indication for the data, and the prefetch throttling circuitry is arranged to identify the target completer element based on the memory address indication. For example, different completer elements may be associated with different address ranges, and hence based on the memory address indicated in a prefetch transaction it is then possible to determine the appropriate completer element to use as the target completer element for that prefetch transaction.

There are a number of ways in which the congestion tracking circuitry can seek to maintain congestion indications for the plurality of routes. However, in one example implementation, the congestion tracking circuitry is arranged, on receipt of a response for a given transaction initiated by the requester element, to extract from the response congestion information pertaining to the route used for the given transaction, and to update the congestion indication for the route in dependence on the extracted congestion information.

There are various ways in which the congestion indication can be updated in dependence on the extracted congestion information. For example, the existing congestion indication could merely be replaced with a new congestion indication based on the extracted congestion information. Alternatively, the existing congestion indication could be merged in an appropriate manner with the new congestion indication derived from the extracted congestion information. For example, an average of the existing congestion indication and new congestion indication could be taken to form the updated congestion indication. Alternatively, where the congestion indications take the form of discrete levels, then if the new congestion indication identifies a higher level than the existing congestion indication, the existing congestion indication could be incremented to form the updated congestion indication. Similarly, if the new congestion indication identifies a lower congestion level, then the existing congestion indication could be decremented to form the updated congestion indication. By adopting an approach whereby the existing congestion indication is merged with the new congestion indication in a suitable manner, this can be useful in certain situations, by avoiding overreacting to changes in congestion. In particular, such an approach provides some smoothing in the update of the congestion indication.

In one example implementation, at least the congestion indication identifies a congestion level from amongst a plurality of possible congestion levels. In some implementations, the congestion information that is included within the response for a transaction may also directly identify a congestion level. Alternatively, that congestion information may take another form, and for example the congestion tracking circuitry may convert the congestion information extracted from the transaction response into a corresponding congestion level prior to updating the congestion indication maintained for the applicable route.

There are a number of ways in which the congestion information may be provided in association with the transaction. In one example implementation the congestion information is provided by sideband signals that accompany the given transaction as it is routed through the interconnect, and that are arranged to be updated as the given transaction progresses through the interconnect so as to provide the congestion information as part of the response for the given transaction received by the congestion tracking circuitry. Alternatively the congestion information may be provided by one or more fields within the given transaction that are arranged to be updated as the given transaction progresses through the interconnect so as to provide the congestion information as part of the response for the given transaction received by the congestion tracking circuitry.

The interconnect can be constructed in a variety of ways, and the techniques described herein are not limited to any particular form of interconnect. However, in one example implementation the interconnect comprises a plurality of router nodes interconnected by links, with the router nodes being arranged to provide connection points for connecting the elements to the interconnect. The communication path used for communication from a first given element to a second given element then passes from an initiator router node to which the first given element is connected, via one or more links, to a recipient router node to which the second given element is connected, with the number of links being dependent on the relative locations of the initiator router node and the recipient router node and whether there are any intervening router nodes between the initiator router node and the recipient router node along the communication path. Each link may be shared by more than one communication path.

With such a form of interconnect, the router nodes can be used in the process of maintaining the congestion information for a transaction as it is routed through the interconnect. In one example implementation, each router node may maintain link congestion information for the links it is connected to, and may be arranged to update the congestion information for a transaction passing through that router node taking into account the link congestion information for the link on which that transaction is output from that router node.

There are various ways in which the transaction congestion information could be updated based on the link congestion information. For example, if the link on which the transaction is output has a link congestion that exceeds the existing congestion information for the transaction, then the congestion information for the transaction could be updated to reflect the link congestion. Alternatively, to avoid overreacting to high congestion on a single link, the existing congestion information for the transaction could be incremented by a certain amount rather than merely being made equal to the congestion on the link. By way of specific example, if the congestion information for the transaction is maintained in the form of a congestion level, the link congestion information could also be maintained in terms of congestion levels, and then when the transaction is to be output on a link that has a higher congestion level than the existing congestion information for the transaction, the congestion information for the transaction could either be updated to match the link congestion level, or instead the existing congestion level for the transaction could be incremented.

There are various ways in which the router node could maintain link congestion information for its links. However, in one example implementation each router node maintains the link congestion information for the links taking into account link congestion observed over a determined window of time, thus allowing the maintained link congestion information to represent an average congestion. By way of specific example, the router node could maintain a count of active cycles for a link out of some predetermined number of cycles (where active cycles are cycles where the link is in use, and hence more active cycles indicates more utilization, and hence more congestion), and then update an activity factor associated with that link. For instance, every 128 cycles the active cycles count could be checked and then the counter reset. The activity factor could then be updated for the link based on the active cycle count. By way of specific example, with a 2-bit activity factor being used to represent a congestion level, less than 32 active cycles could be used to set the congestion level to 00 indicating the lowest level of congestion. Similarly, between 32 and 63 active cycles could result in setting the congestion level to 01, between 64 and 95 active cycles could result in setting the congestion level of 10, and greater than 95 active cycles could result in setting the congestion level to 11 (i.e. the highest level of congestion). In the same way as discussed earlier, as an alternative to directly overwriting existing congestion levels with the new ones, the 2-bit congestion level value for a link could be incremented or decremented when activity is higher or lower, respectively, than that indicated by the previously stored congestion level value so as to avoid reacting too quickly to changes in activity.

As an alternative to the router node needing to maintain link congestion information for the links, the congestion information maintained for a transaction may instead comprise a stall cycle counter. Each router node could then be arranged to update the stall cycle counter for a transaction passing through that router node whenever the transaction is stalled at that router node awaiting availability of the link on which that transaction is to be output from the router node. In one example implementation, a saturating counter may be used so that the counter cannot roll over to a lower value. In implementations where the congestion indication maintained for each route identifies a congestion level, then the congestion tracking circuitry can be arranged, on extracting the stall counter information from a transaction response, to convert the stall cycle count into a congestion level, and then update the existing congestion indication for the associated route appropriately.

As a yet further alternative implementation, the congestion information for the given transaction may be updated as the given transaction passes through the interconnect in order to provide to the congestion tracking circuitry sufficient information in the response to enable the congestion tracking circuitry to determine an uncontended latency value for the given transaction. In addition, time stamp information can be maintained to identify when the given transaction is issued onto the interconnect by the initiator router node and when the response for that given transaction is received back at the initiator router node. The congestion tracking circuitry can then be arranged to determine a round trip time for the given transaction using the time stamp information, and determine the congestion indication by subtracting the uncontended latency value from the round trip time. If desired, the resulting value can be quantized into a congestion level as discussed earlier.

The sufficient information in the response that is used by the congestion tracking circuitry to determine the uncontended latency value can take a variety of forms, but in one example implementation may identify the number of links in a round trip route via which the given transaction is issued from, and returned to, the requester element, and/or an access time indication for any element accessed to process the transaction. The access time indication information can take a variety of forms, for example an indication as to whether a hit or a miss has occurred in a completer element to which the transaction was routed, and/or an indication of access timing information associated with accessing such a completer element. In some instances, other information can be used to infer timing. For example, the identity of the final completer element may be enough to determine whether there has been a hit or a miss. For instance, if a memory controller is the entity that returns the final response, then it may be inferred that there was likely a cache miss at a system cache acting as an initial target completer element.

In many systems, a cache coherency protocol may be used to maintain a coherent view of data in the various cache structures within the system. This could give rise to some coherence phenomena that may cause a distorted view of the latency. For example, if a transaction is forwarded, from a system cache completer element that has associated coherency logic, to another requester element that is expected to have a copy of the data, and that requester element has in the intervening period discarded the data, that other requester element may send a reply indicating it does not have the data, and then the system cache/coherency logic would need to propagate the request on to a memory controller, this effectively adding two hops to the transaction. As another example, if the coherence state of the data is unresolved at the coherency logic at the time the transaction is received, the transaction could be stalled whilst pending transactions finish. Latencies incurred by such coherence phenomena may be inappropriate to capture within the congestion information, as it could give a distorted view of the congestion associated with the interconnect routes. Hence, if desired, extra information could be included in the transaction that can be set to indicate when a coherency protocol action has stalled the transaction, and any timing impact associated with that coherency action could then be ignored by the congestion tracking circuitry.

The plurality of routes for which congestion indications are maintained can take a variety of forms, but in one example comprise round trip routes through the interconnect via which a transaction is issued from, and returned to, the requester element, where each round trip route comprises multiple communication paths, but the routes may in addition, or alternatively, comprise routes associated with individual communication paths within the interconnect over which a transaction may be propagated.

In situations where one or more routes are associated with individual communication paths, then the congestion information that is maintained within the transaction as it is routed through the interconnect can be arranged to provide congestion information for one or more of the different communication paths that are used to route the transaction over its round trip route. By providing this additional information, it is then possible to not only update the congestion indication for the round trip route, if such a congestion indication is maintained, but also to update congestion indications for individual communication paths within that round trip route.

The target completer element can take a variety of forms, but in one example implementation the target completer element may be an intermediate element, and under at least one condition the target completer element is arranged to forward the given transaction to a further completer element for processing.

In one example implementation the transaction can maintain information that indicates whether it has been forwarded from the target completer element to a further completer element. The congestion tracking circuitry may then be arranged to determine, from the response for the given transaction, whether the given transaction has been forwarded to the further completer element, and to interpret the congestion information in dependence on that determination. For example, using that information, the congestion tracking circuitry can determine which route was used by the transaction and update the congestion indications that it is maintaining accordingly.

By way of specific example, the congestion tracking circuitry may be arranged to maintain a congestion indication for both a first round trip route where the given transaction is processed by the target completer element, and a second round trip route where the given transaction is forwarded by the target completer element to the further completer element for processing. Hence, by virtue of being able to determine from the response whether the transaction has been forwarded to the further completer element, the congestion tracking circuitry can determine which congestion indication to update.

In one example implementation, the congestion tracking circuitry may be arranged to maintain routes associated with certain individual communication paths, instead of, or in addition to round trip routes. As an example, the congestion tracking circuitry may be further arranged to maintain additional congestion indications for at least one of: a communication path from the requester element to the target completer element; a communication path from the further completer element to the requester element; and a communication path from the target completer element to the further completer element. The prefetch throttling circuitry may then be arranged to determine how to handle the given prefetch transaction that the requester element wishes to initiate, taking into account the congestion indication for the route between the requester element and the target completer element, and the additional congestion indications.

There are various ways in which the prefetch throttling circuitry could determine how to handle the given prefetch transaction dependent on the additional congestion indications for the above types of communication path. For example, by maintaining congestion indication information for the individual communication paths mentioned above, this may be useful if the requester has the option to seek to prefetch data into a system cache without that data being returned to the requester. For example, if the communication protocol used allows the requester to send a hint to an intermediate element or a memory controller without requiring a data response, the requester could choose to only prefetch data to the intermediate element, for example if the communication path from the further completer element (e.g. a memory controller) to the requester element is congested. In such a manner, the congested path could be avoided, and a later demand access may still hit in the intermediate element/system cache later.

Hence, in such a situation, the prefetch transaction may be fulfilled by routing the prefetch transaction over the communication path from the requester element to the target completer element (in this example the target completer element including a system cache) and in the event of a miss the data would then be retrieved from the further completer element (in this case a memory controller) but with that data being returned back to the intermediate element/system cache for caching, rather than the data being returned from the memory controller to the requester element, thereby avoiding the congested path from the memory controller to the requester element.

As another example, the requester could indicate in the transaction request that the data should be returned via the intermediate element instead of directly from the further completer element if the communication path from the further completer element back to the requester element is known to be congested. Hence, instead of having the further completer element (e.g. memory controller) directly respond to the requester, it could be instructed to respond to the intermediate element, and then the intermediate element could respond to the requester. This would avoid the known congested route whilst still performing the full prefetch back to the requester element.

As another option, if the communication path from the requester element to the further completer element also has congestion indication information maintained for it, then in situations where the route from the requester to the memory controller has low congestion, and a communication path involved in routing a prefetch transaction to the intermediate completer element (for example the system cache) has high congestion, then it may be possible for the prefetch transaction request to be sent directly to the memory controller. The memory controller could then prefetch the data and send it directly back to the requester, or alternatively send the data to the intermediate element for caching in the associated system cache, from where it could then later be prefetched by the requester element if that data becomes useful. This latter approach could result in a prefetch to the system cache without employing the congested route from the requester to the system cache.

As a yet further example, if the route from the intermediate element/initial target completer element to the further completer element is congested, then the prefetch throttling circuitry may decide to reject the prefetch transaction, particularly if for example there is an expectation that the transaction will miss in the system cache of the intermediate element, and hence need to be forwarded to the further completer element/memory controller. As a still further example, a special transaction could be used which would indicate to the intermediate element that the prefetch transaction should be dropped if there is a cache miss at the intermediate element, hence avoiding propagation of the prefetch transaction over the congested route between the intermediate element and the further completer element.

The above are merely examples of how congestion indications about individual communication paths could be used when deciding how to handle an incoming prefetch transaction, and it will be appreciated that there are many other ways in which such prefetch transactions could be handled based on this finer granularity of congestion indication data.

In one example implementation where the congestion information in the response provides congestion information for at least one individual communication path, the congestion tracking circuitry may be arranged to update the congestion indication for one or more routes that incorporate that individual communication path. Hence, not only may the congestion indication for the route used to route the given transaction be updated, but also one or more other routes that incorporate the individual communication path could additionally have their congestion indications updated.

The intermediate element that can in some instances form a target completer element can take a variety of forms. However, in one example implementation such an intermediate element is arranged to provide a system cache for caching data associated with a chosen memory address range, and the further completer element is a memory controller used to control access to memory within at least a portion of the chosen memory address range.

If desired, the earlier described congestion indications can also be used in combination with a busyness indication associated with one or more elements coupled to the interconnect. For example, the prefetch throttling circuitry may further be arranged to receive a busyness indication for the target completer element, and may be arranged to determine whether to issue the prefetch transaction in dependence on the congestion indication for the route to be used to propagate the given prefetch transaction, and the busyness indication. Hence, prefetch transactions could selectively be dropped not only when the route to be employed for such a prefetch transaction appears congested, but in addition that decision can take into account how busy the target completer element is. This allows the technique to be used to both alleviate congestion within the communication paths of the interconnect, and to alleviate the workload on certain target completer elements that are currently deemed to be relatively busy. There are various ways in which the busyness indication can be generated, but it may for example be generated by a completer element based on the level of occupancy of its pending transaction queues.

As an alternative to the prefetch throttling circuitry considering both the busyness indication and the congestion indication, the congestion tracking circuitry may be further arranged to receive such a busyness indication for the target completer element, and to adjust the congestion indication for the route to be used to propagate transactions to that completer element taking into account the received busyness indication. There are various ways in which the busyness indication could be factored into such an adjustment. For example, the congestion indication for the route could be updated to reflect the worse of the congestion measurement and the busyness measurement, and use that as the new congestion indication. This for example may be a useful approach if both the busyness indication and the congestion indication are indicated by a number of discrete levels, and hence a ready comparison can be made between the busyness indication and the congestion indication.

The congestion tracking circuitry and the prefetch throttling circuitry can be located at a variety of locations within the system incorporating the above described techniques. However, in one example implementation the apparatus further comprises interface circuitry providing an interface between the requester element and the interconnect, wherein at least one of the congestion tracking circuitry and the prefetch throttling circuitry is provided within the interface circuitry. In such an implementation, the congestion tracking circuitry and/or the prefetch throttling circuitry can be implemented as functionality associated with the interconnect, with that functionality then intercepting the prefetch transactions issued by a connected requester element and applying the above described functions to determine whether to allow the prefetch transaction to be propagated through the interconnect, or instead to decide that the prefetch transaction should be dropped.

The requester elements may themselves take a variety of forms, but in one example may comprise a local cache storage and prefetch circuitry associated with the local cache storage, and the prefetch circuitry is arranged to issue to the interface circuitry the indication of the prefetch transaction that the requester element wishes to initiate. Hence, in this example the prefetch circuitry will operate in a standard manner to determine prefetch transactions that it wishes to initiate, and these will then be issued by the requester element for interception by the earlier-mentioned interface circuitry, where the congestion tracking circuitry and the prefetch throttling circuitry may then operate as discussed earlier.

However, in an alternative implementation at least one of the congestion tracking circuitry and the prefetch throttling circuitry may be provided within the requester element. This would allow a potential prefetch transaction to be dropped at source before it is even issued by the requester element, but would require the congestion indication information to be propagated to the requester element to enable the prefetch throttling circuitry to make the appropriate decisions based on the indicated congestion.

Particular examples will now be described with reference to the figures.

FIG. 1 is a block diagram of a system in which the techniques described herein may be implemented. As shown, a requester element 10 may be coupled via an interconnect 30 with a number of completer elements 40, 45, 50. As mentioned earlier, the techniques described herein may be employed within interconnects that adopt various different routing schemes, and hence may be applicable to both interconnects the employ dynamic/adaptive routing schemes and interconnects that employ static routing schemes. However, for the purposes of the following discussion, it will be assumed that a static routing scheme is employed, and hence, as schematically shown in FIG. 1, the interconnect may implement communication paths 35 that implement a static routing scheme such that a specific communication path is always employed when communicating from a first given element to a second given element. Hence, purely by way of example, it will be predetermined which communication path 35 within the interconnect is used when sending a communication from the requester element 10 to the completer element 40. Similarly, there will be a predetermined return path used when sending a communication from the completer element 40 back to the requester element 10. It should however be noted that that will not necessarily be the same communication path as was used by the outbound communication from the requester element to the completer element. For example, the various routing structures within the interconnect will often apply a relatively simple routing scheme that will determine the links over which the communications are forwarded within the interconnect in order to implement the communication path in any particular direction, and it is often the case that the path over which a response is routed from a completer to a particular requester is different to the path that was used when sending the request from the requester to that completer element.

Whilst in FIG. 1 a single requester element 10 is considered, as noted by the dotted boxes 15, 25, one or more additional requester elements may be connected to the interconnect, via associated interface circuitry, and the techniques described herein in respect of the requester element 10, and in particular the handling of prefetch transactions issued by such a requester element, can also be applied in connection with any other requester elements coupled to the interconnect 30.

As shown in FIG. 1, and as will be discussed in more detail later, the interface circuitry 20 associated with the requester element 10 may include a number of components, including components provided for tracking congestion within the interconnect, and for throttling prefetch transactions received from the requester element in dependence on the tracked congestion.

As shown in FIG. 1, a requester element may issue both demand requests to access data that is actually required by the operations currently being performed by the requester element, but also can issue prefetch requests in order to seek to retrieve into the requester element (for example into any local cache structure provided within the requester element) data that the requester element is anticipating wanting to access during subsequent operations not yet being performed by the processing circuitry within that requester element. By using such prefetching, this can improve performance by increasing the hit rate within one or more local cache structures provided within the requester element, and hence avoiding the need to issue demand requests via the interconnect to one or more completer elements in order to obtain the data from a system level cache or main memory.

Figure 2:
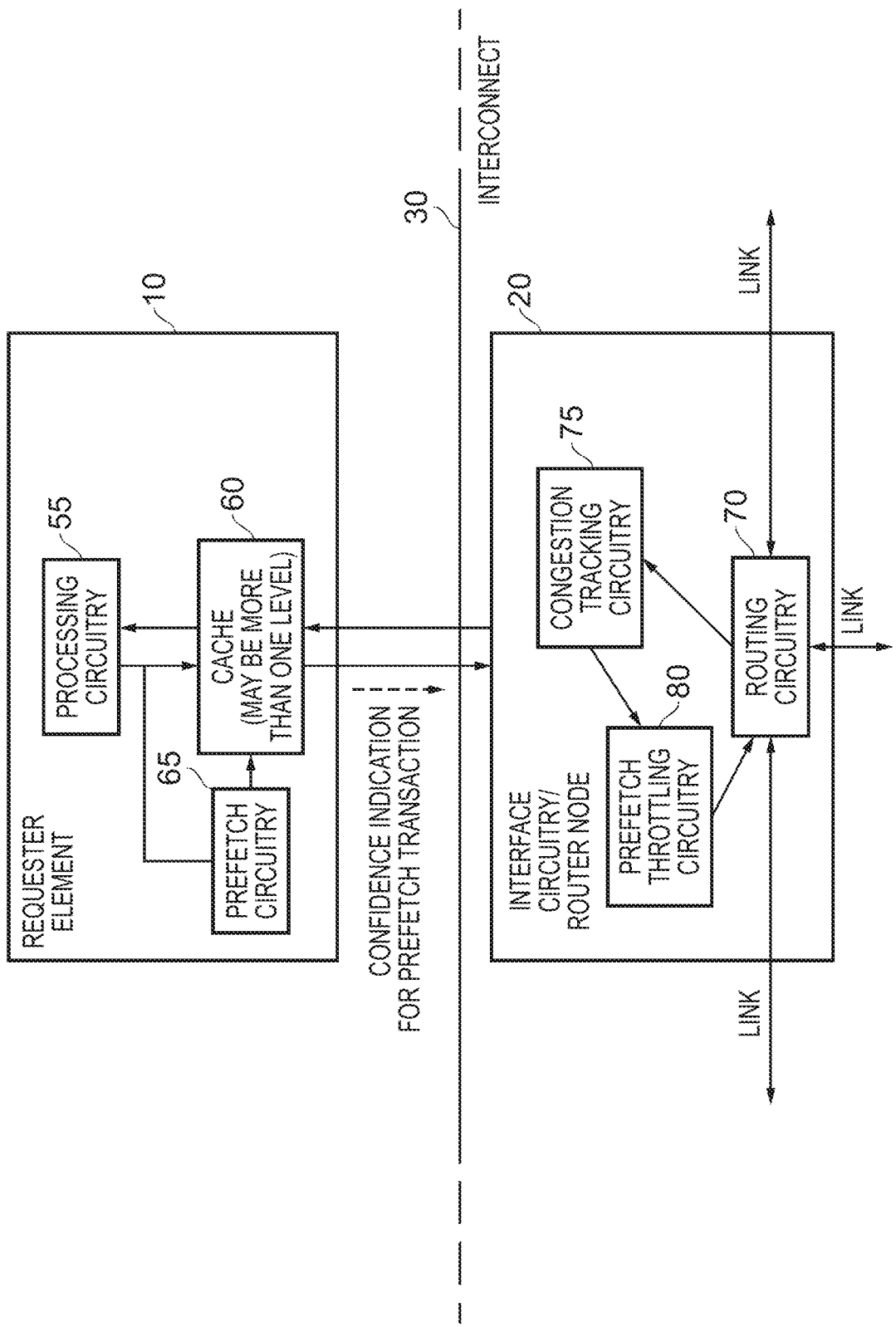
FIG. 2 is a block diagram illustrating in more detail components that may be provided within a requester element and associated interface circuitry of the interconnect, in accordance with one example implementation.

More details of components that can be provided within the requester element 10 and the interface circuitry 20 of the interconnect 30 is shown in FIG. 2. Herein, the interface circuitry may also be referred to as a router node. As shown in FIG. 2, processing circuitry 55 is provided within the requester element 10 for performing a series of data processing operations, for example operations required by a stream of instructions fetched from memory into the requester element. One or more levels of cache 60 may be provided in association with the processing circuitry 55 for locally storing a subset of the data available in memory, so as to improve access speeds. A prefetch circuit 65 may also be associated with one or more of those levels of cache, and can be arranged to monitor the demand accesses being issued by the processing circuitry, with the aim of seeking to predict what demand accesses the processing circuitry may make in due course. Based on that analysis, the prefetch circuitry can then issue via the cache 60, prefetch requests, that are then output to the interface circuitry 20 in order to seek to retrieve into the cache 60 data that is anticipated to be of future use to the processing circuitry 55.

As a result, there can be a mixture of demand transactions relating to actual data required by the processing circuitry 55, and prefetch transactions relating to data anticipated to be of future use to the processing circuitry, passed over a communication link between the requester element 10 and the interface circuitry 20 of the interconnect. As will also be discussed in more detail later, in accordance with some example implementations, a confidence indication may be associated with each prefetch transaction, to provide an indication of the relative confidence the prefetch circuitry has that the data will be of future use to the processing circuitry. In particular, the prefetch circuitry can adopt different levels of aggression with regard to the extent to which it prefetches data, and some of those prefetches may be more speculative than others, and hence of a relatively lower confidence than others, and that confidence indication can be passed in association with each prefetch transaction to the interface circuitry 20.

The interface circuitry/router node 20 includes routing circuitry 70 used to route each received transaction over a suitable link to an adjacent router node within the interconnect, the routing decision being based on the determined completer element to which any particular transaction should be issued. In particular, each transaction will typically provide a memory address indication indicative of the memory address at which the required data is held, and each completer element may be associated with a particular address range within the memory address space. Further, the routing circuitry has knowledge of the communication paths provided by the interconnect, and hence can determine, based on knowledge of which completer element a transaction needs to be sent to, which link that transaction should be output over.

As will be discussed in more detail later, the interconnect can be constructed in a variety of different ways, but in one example is constructed as a mesh network of router nodes. Any particular element coupled to the interconnect will be connected to one of those nodes, and hence a destination node for a transaction can be determined based on the memory address. The routing circuitry can then adopt a relatively simple scheme for deciding how to propagate any particular transaction onwards through the interconnect. For instance, considering a simple x, y grid of router nodes, the routing circuits within the various router nodes may be arranged, for example, to propagate a transaction in the x dimension first until aligned with the x dimension of the destination router node connected to the target completer element, and then to propagate the transaction in the y dimension until it reaches the destination router node to which the target completer element is connected. The same routing scheme can then be used to route the response of the transaction back to the requester element.

In accordance with the techniques described herein, the router node may also provide congestion tracking circuitry 75 and prefetch throttling circuitry 80. The congestion tracking circuitry is arranged to maintain, for the associated requester element 10, a congestion indication for each of a plurality of routes through the interconnect used to propagate transactions initiated by the requester element 10. Each route may contain one or more communication paths, where a communication path is a path provided between particular elements connected to the interconnect. Hence, where the target completer element for a transaction is determined to be an intermediate element associated with a system cache, such an intermediate element also being referred to herein as a home node, then there will be a communication path from the requester element to that home node, and also a separate communication path back from that home node to the requester element. If a route comprises the round trip route from the requester element to the home node and back to the requester element, it will be seen that that route comprises two communication paths.

However, in some implementations, one or more of the routes that the congestion tracking circuitry keeps track of may be more complex routes. For example, considering the home node mentioned above, which provides a system cache, it is possible that the data requested by a particular transaction is not present in that system cache, this resulting in a miss condition. In that instance, the intermediate element formed by the home node may propagate the transaction on to a further completer element, which could for example be a memory controller associated with a memory device. The memory controller may then perform an access within the memory device to obtain the data, and return that data over another communication path from that memory controller back to the requester element. In such a situation, it will be seen that the route comprises three communication paths, namely a communication path from the requester element to the home node, a communication path from the home node to the memory controller, and another communication path back from the memory controller to the requester element.

The congestion tracking circuitry 75 can be arranged to maintain congestion indications for each of these various types of routes, or just for a certain subset of them. Further, as will be discussed in more detail later, in addition to round trip routes, or indeed as an alternative thereto, one or more of the routes that congestion indications are maintained for may be routes that only include a single communication path. For example, a congestion indication could be kept for a communication path from the requester element 10 to a particular completer element.

Prefetch throttling circuitry 80 can then be arranged to intercept any prefetch transaction issued by the requester element 10, and apply criteria to determine whether to allow that prefetch transaction to be propagated on by the routing circuitry 70, or whether instead the prefetch transaction should be rejected. In particular, it will be appreciated that correct functionality of the system is still ensured even if a prefetch transaction is rejected, since the prefetch transaction is merely seeking to improve performance by promoting data into a local cache structure 60 earlier than it is needed by the processing circuitry 55. However, it is also the case that prefetch transactions are not always accurate, and can in fact prefetch data that is not subsequently used by the processing circuitry. In that case, such prefetch transactions have consumed bandwidth within the interconnect that is not serving any useful purpose. The inventors have realised that there are often certain links within the interconnect that become particularly congested, and this can cause congestion within multiple of the routes through the interconnect that use such links. Given that prefetch transactions do not need to be performed, the aim of the prefetch throttling circuitry 80 is to seek to reject certain prefetch transactions when they are seeking to use a route that the congestion tracking circuitry 75 indicates is relatively congested.

Hence, in response to receipt of a given prefetch transaction from the requester element 10, the prefetch throttling circuitry 80 can determine, from the address specified by the prefetch transaction, the appropriate target completer element to which that transaction should be forwarded. It can reference the congestion tracking circuitry 75 to get an indication of the congestion associated with the route that would need to be used through the interconnect to communicate with that target completer element. Based on this information, and optionally taking into account the earlier-mentioned confidence indication that may also be provided with prefetch transactions, the prefetch throttling circuitry 80 can then determine whether to issue the prefetch transaction, hence passing it to the routing circuitry 70 for onward propagation, or whether instead to reject the prefetch transaction. In the case the prefetch transaction is rejected, the prefetch throttling circuitry 80 may cause a rejection signal to be issued back to the requester element 10 to identify that the prefetch transaction is not being performed.

Whilst in FIG. 2 both the congestion tracking circuitry 75 and the prefetch throttling circuitry 80 are shown as components within the interface circuitry 20 of the interconnect 30, in an alternative implementation one or more of these structures may be provided within the requester element. For example, the prefetch throttling functionality could be incorporated within the prefetch circuitry 65, which could then reference the congestion tracking circuitry at the time it is considering issuing a prefetch transaction, and selectively drop that prefetch transaction at source if it determines that that prefetch transaction would be routed over a relatively congested route through the interconnect.

Figure 3:
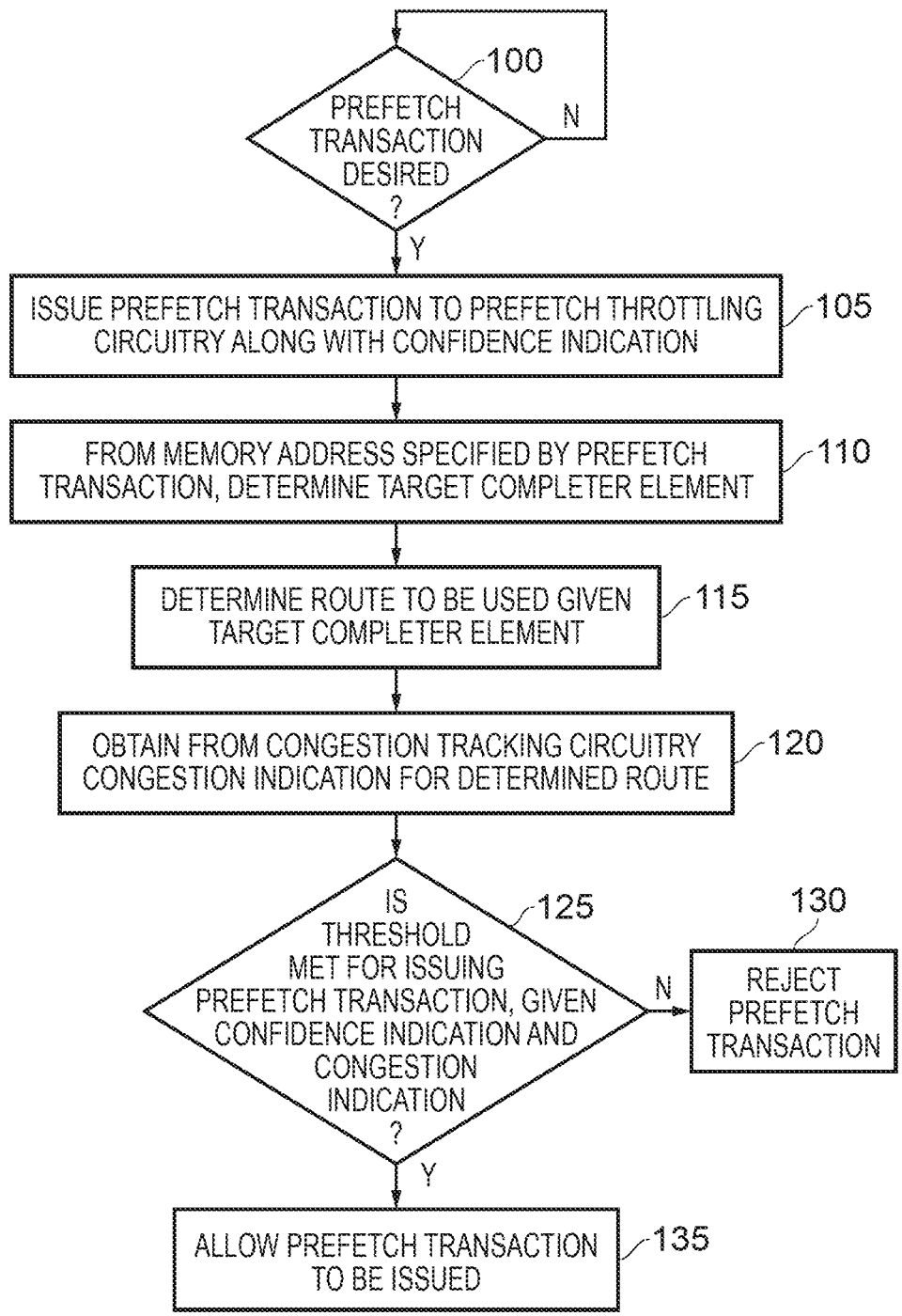
FIG. 3 is a flow diagram illustrating how a prefetch transaction may be handled, in accordance with one example implementation.

FIG. 3 is a flow diagram illustrating the handling of a prefetch transaction in accordance with the techniques described herein. At step 100, it is determined whether a prefetch transaction is desired. This for example may be the case when a prefetch transaction is issued from the requester element 10 to the interface circuitry 20. Upon receipt of such a prefetch transaction, then at step 105 the prefetch transaction is passed on to the prefetch throttling circuitry 80 along with any confidence indication that is provided in association with the prefetch transaction.

At step 110, the target completer element for the transaction is determined having regard to the memory address specified by the prefetch transaction. In particular, as mentioned earlier, certain target completer elements can be associated with different memory address ranges, and hence the required target completer element for any particular prefetch transaction can be determined. Further, the prefetch throttling circuitry may have access to information indicating the router node within the interconnect that the required target completer element is coupled to, and hence can at step 115 determine the route to be used through the interconnect given the target completer element. As indicated by step 120, it can then obtain from the congestion tracking circuitry a congestion indication for the determined route.

At step 125 it can then be determined whether a predetermined threshold has been met for issuing the prefetch transaction given the congestion indication, and optionally also given the confidence indication provided by the prefetch transaction. Hence, it can for example be decided that once the congestion indication is above a certain level, prefetch transactions should be dropped. Further, if the confidence indication is also taken into account, then those thresholds can vary dependent on different levels of confidence, so that the lower the confidence associated with a particular prefetch transaction, the more readily it is dropped.

If at step 125 it is determined that the required threshold has not been met, then the prefetch transaction is rejected at step 130, whereas otherwise the prefetch transaction is allowed to be issued via the routing circuitry 70 at step 135.

Figure 4:
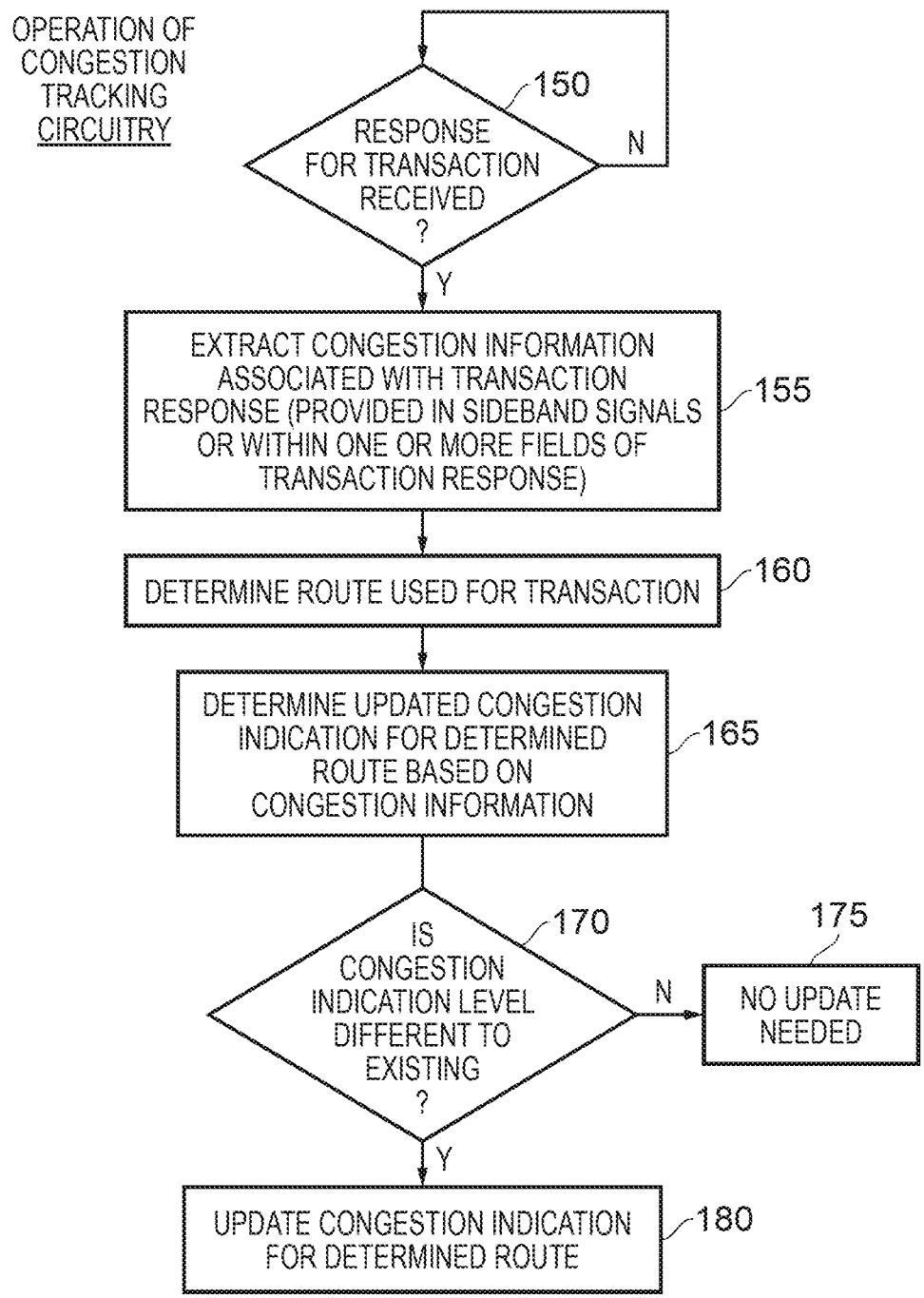
FIG. 4 is a flow diagram illustrating the operation of the congestion tracking circuitry in accordance with one example implementation.

FIG. 4 is a flow diagram illustrating the operation of the congestion tracking circuitry 75. Assuming a transaction is issued from the router node associated with the requester element, then that transaction will traverse through the interconnect, via one or more completer elements, and ultimately a response for that transaction will be received back at the router node associated with the requester element. At step 150, it is determined whether the response for the transaction has been received. If it has, then the process proceeds to step 155. In accordance with the techniques described herein, congestion information is added in association with a transaction as it traverses the interconnect, and once the transaction response is received, that congestion information is extracted at step 155 by the congestion tracking circuitry 75. There are various ways in which the congestion information may be provided in association with the transaction response—for example it may be provided in one or more sideband signals, or alternatively may be provided within one or more fields of the transaction response.

At step 160, the congestion tracking circuitry then determines the route used for the transaction. Typically, this can be determined from information provided within the response. For example, the response may indicate which completer element provided the response, and hence enable a determination of the route that has been used for the transaction. Based on the earlier discussions, it will be appreciated that the route may depend for example on whether there has been a hit in the initial target completer element to which the transaction was directed. For example, if that initial target completer element was the earlier described home node associated with a system cache, then in the event of a miss the transaction may have been propagated on to a memory controller, and hence the route used will differ from the route that would have been used had there been a hit at the home node.

Once the route has been determined, then an updated congestion indication for that route can be determined based on the congestion information that has been extracted at step 155, this determination process taking place at step 165 in FIG. 4. In one example implementation, the congestion indications are expressed in terms of a number of discrete levels, and hence at step 165 a congestion indication level will be determined based on the extracted congestion information.

At step 170 it is determined whether the congestion indication level is different to the existing congestion indication level maintained by the congestion tracking circuitry 75 for the route in question. If not, then as indicated by step 175, no update is needed to the information maintained by the congestion tracking circuitry.

However, if the congestion indication level is different, then the process proceeds to step 180 where the congestion indication for the determined route is updated. There are various ways in which such an update can be performed. For example, the existing congestion indication may be replaced with the new congestion indication determined at step 165, or alternatively the existing congestion indication may be merged with the new congestion indication in some suitable manner. Purely by way of example, the existing congestion indication level could be incremented if the new congestion indication level was higher than the existing congestion indication level, or could be decremented if the new congestion indication level was less than the existing congestion indication level.

Figure 5A:
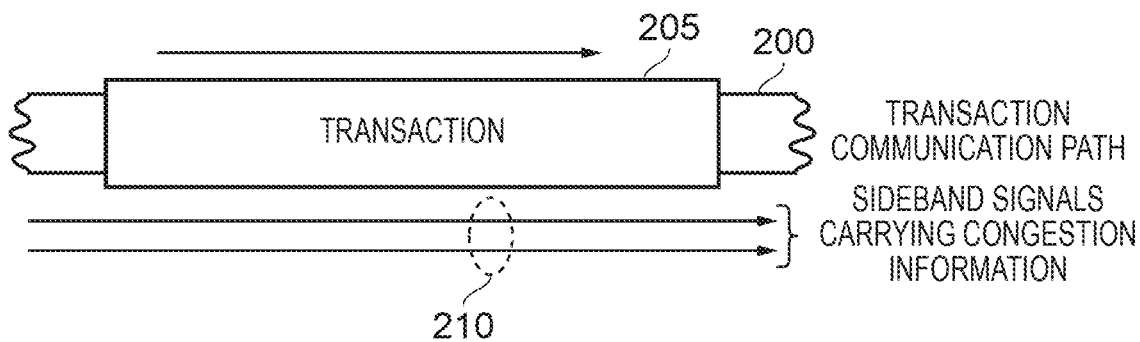
FIGS. 5A and 5B schematically illustrate two different mechanisms via which congestion information can be transported in association with a transaction.
Figure 5B:
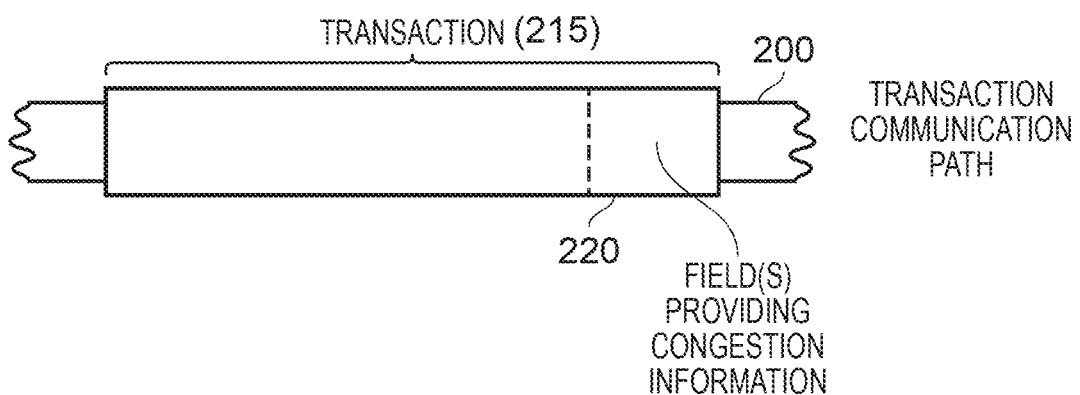

FIGS. 5A and 5B illustrate two different ways in which the congestion information can be maintained in association with a transaction as that transaction is routed through the interconnect. As shown in FIG. 5A, in a first example implementation, as the transaction 205 is propagated over a transaction communication path 200, one or more sideband signals 210 can be provided that can be used to carry the required congestion information, with the content of those sideband signals being updated as the transaction is routed through the interconnect, for example by the various router nodes through which the transaction passes.

FIG. 5B illustrates an alternative implementation where the transaction 215 is extended so as to provide one or more fields 220 that can be used to hold the congestion information, and again that congestion information can be updated as the transaction is propagated through the interconnect, for example via the router nodes through which that transaction passes.

As mentioned earlier, the present technique can be applied in association with any suitable interconnect structure. In one particular example implementation, a mesh interconnect may be employed, such as shown schematically in FIG. 6. In this example, all of the requester elements take the form of processor cores, and as shown those processor cores can be connected to any of the nodes within the interconnect. As also shown, multiple home nodes can be provided, which in one example implementation collectively implement a system cache, and may also include associated cache coherency circuitry to keep every core's view of the data consistent. In particular, individual cores may also have their own local cache structures, and a suitable cache coherency protocol could be employed to ensure that each core sees a consistent view of any particular data item. In the example shown, the home nodes each implement a shared cache slice, and hence the system cache is implemented collectively by the plurality of home nodes, with any particular home node being responsible for a particular address range.

Similarly, multiple memory controllers may be connected to router nodes within the interconnect and, as with the home nodes, the memory controllers may be associated with different memory address ranges. Each memory controller may be coupled to suitable memory storage used to store the data within the associated address ranges.

Figure 6:
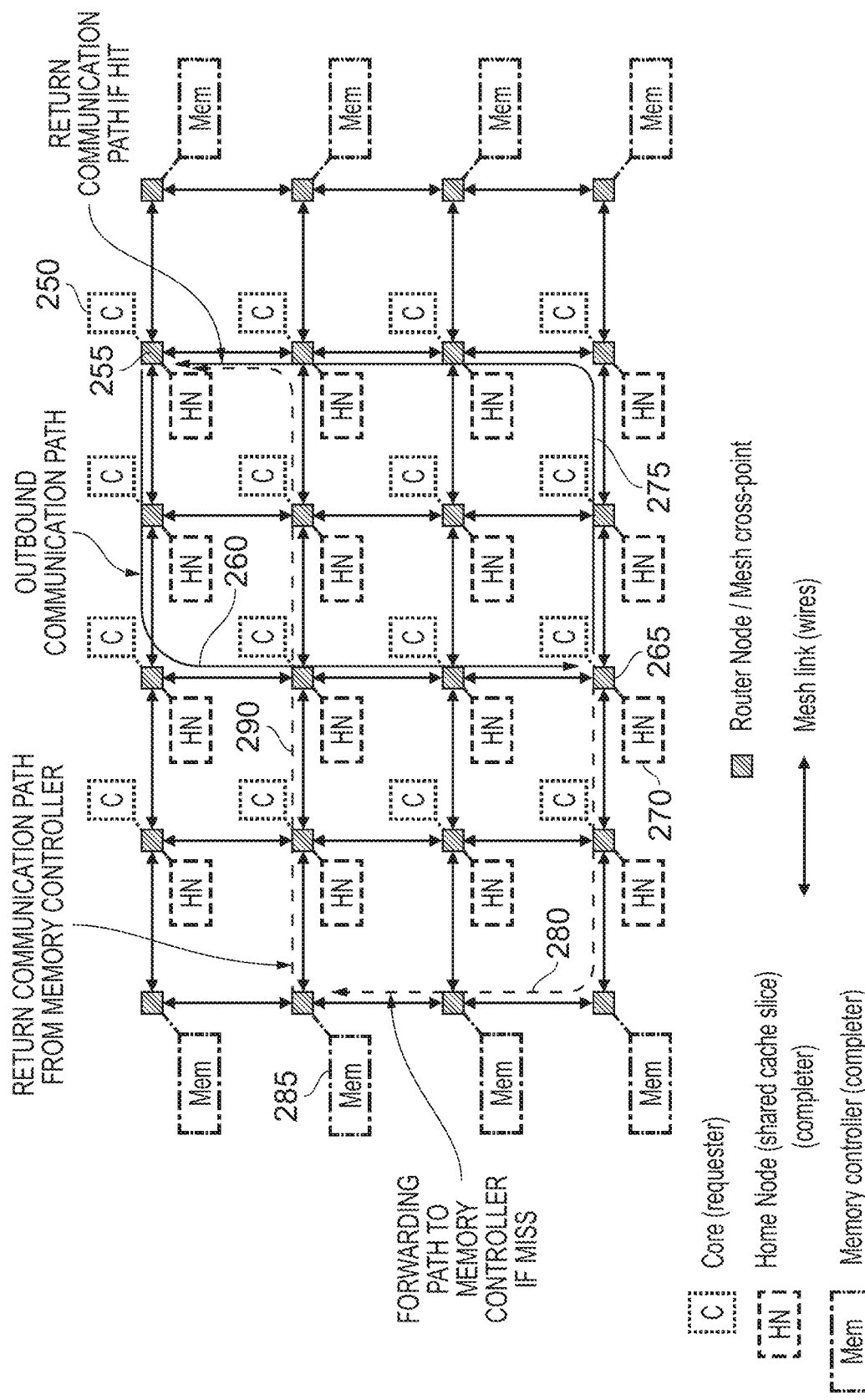
FIG. 6 is a diagram schematically illustrating an example mesh interconnect in which the techniques described herein may be implemented.

As shown by way of example in FIG. 6, the processor core 250 that is connected to the router node 255 may issue a transaction over an outbound communication path 260 to the router node 265 connected to the home node 270. As will be apparent from the earlier discussion of FIG. 2, this routing will be achieved via the routing circuits 70 within each of the router nodes along that communication path. In particular, based on the memory address specified by the transaction issued by the core 250, a determination can be made as to the appropriate completer element to forward that transaction to. In this case, it is assumed that the transaction relates to a memory address that is cacheable, and that that memory address falls with a memory address range that is associated with the home node 270. Hence, the routing circuitry within the various router nodes propagates the transaction two links to the left so as to align the transaction with the y dimension in which the home node 270 is present, and then routes the transaction in the y dimension across three links until it reaches the node 265, from where the transaction can be processed by the home node.

In the event of a hit, then the requested data can be supplied directly by the home node, and a response for the transaction can be routed over the return communication path 275. Again, the routing nodes transfer the communication in the x dimension first, and then in the y dimension, and as a result it can be seen that the return communication path 275 is different to the outbound communication path 260.

In the event of a miss within the home node 270, then the home node may forward the transaction on via the path 280 to the appropriate memory controller for the address range in question, in this case it being assumed that that is the memory controller 285. The memory controller will then perform an access within memory to obtain the data, and that data will be returned over the communication path 290 to the router node 255 coupled to the requester element 250.

In accordance with the techniques described herein, the individual router nodes through which a transaction passes can be arranged to update the congestion information maintained in association with the transaction so as to be indicative of the congestion observed over the communication path or communication paths via which the transaction is routed. Various ways in which this congestion information can be maintained and updated will be discussed in more detail later.

Figure 7:
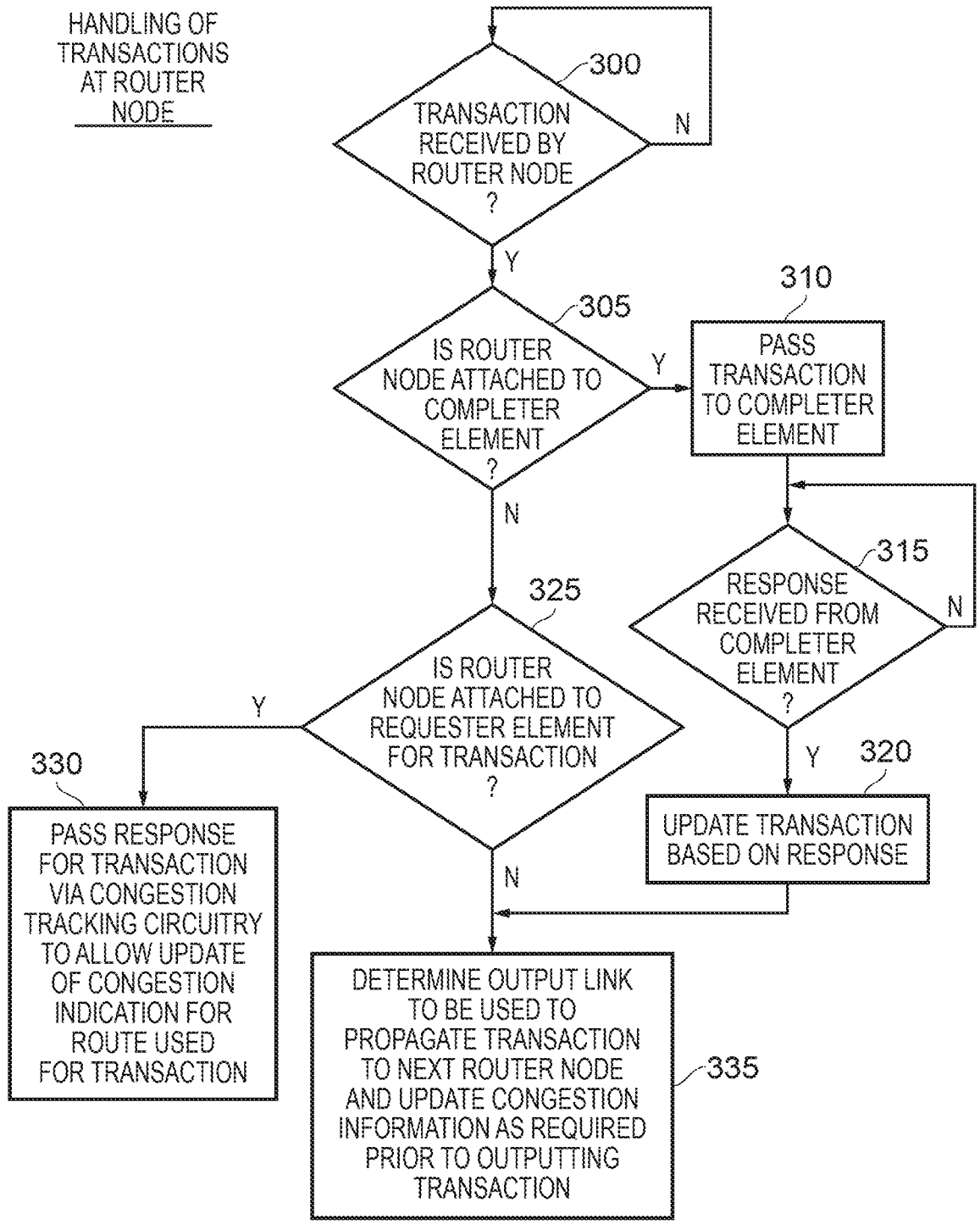
FIG. 7 is a flow diagram illustrating the handling of transactions at a router node within the interconnect of FIG. 6, in accordance with one example implementation.

FIG. 7 is a flow diagram illustrating how a transaction is handled at any particular router node. At step 300, it is determined whether a transaction has been received by that router node, and when it has it is determined at step 305 whether that router node is attached to the target completer element for the transaction. If that is the case, then at step 310 the transaction is passed from the router node to the completer element for processing. It is then determined at step 315 whether a response has been received from the completer element, and when it has the transaction is updated based on that response at step 320. Hence, when the transaction relates to a read request, the data retrieved by the home node may be added to the transaction to enable it to be propagated on within the response passed back to the requester element.

If at step 305 it is determined that the router node is not attached to the completer element, it is then determined at step 325 whether the router node is attached to the requester element. If this is the case, then this means that the transaction has been through its entire route, and now is providing the response requested by the requester element. Accordingly, the process then proceeds to step 330, where the response for the transaction is passed back to the requester element. However, in addition this response is passed via the congestion tracking circuitry 75 discussed earlier, so as to allow an update of the congestion indication for the route used for the transaction to be made. At this point, the earlier-described process of FIG. 4 can be implemented to update the congestion indication information.

If at step 325 it is determined that the router node is not attached to the requester element, then this means that the router node is an intermediate router node that will need to forward the transaction on to the appropriate adjacent router node via one of its connected links. Hence, if the "no" path is followed from step 325, or indeed following update of the transaction at step 320, the process proceeds to step 335 where the appropriate output link to be used to propagate the transaction to the next router node is determined. At this point, the congestion information may also be updated as required prior to outputting the transaction. The way in which the congestion information may be updated in accordance with various different example implementations will now be discussed with reference to FIGS. 8A to 10.

Figure 8A:
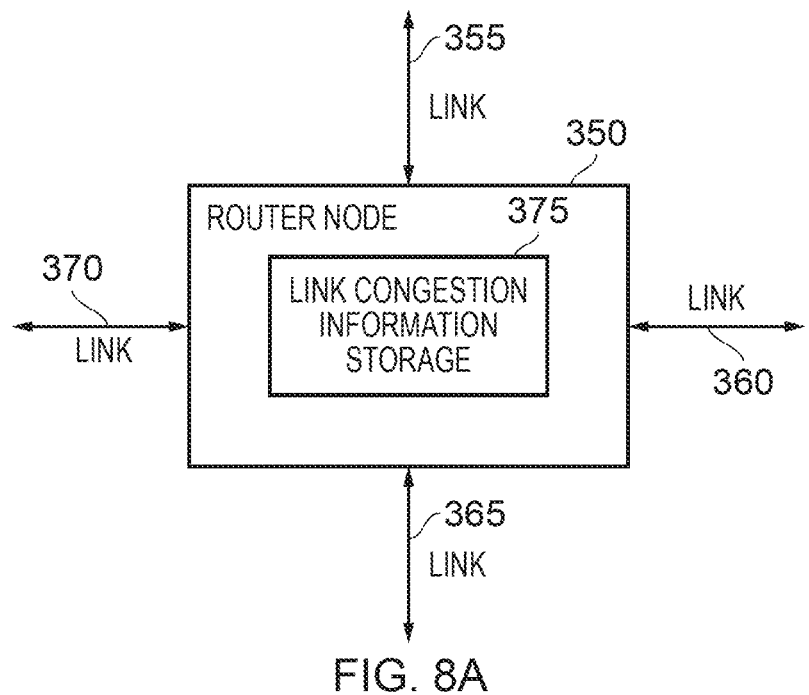
FIG. 8A illustrates how link congestion information may be maintained within a router node in accordance with one example implementation, whilst

In accordance with the approach illustrated schematically in FIG. 8A, each router node 350 may maintain link congestion information for each of its connected links 355, 360, 365, 370, for example by storing this information within a local link congestion information storage 375. Hence, in accordance with such an approach each router node may maintain some activity factor information for each of its links. As one example implementation, the router could maintain a count of active cycles for a link out of some number of cycles, and then update its activity factor accordingly. For instance, every 128 cycles the active cycle count could be checked for each link and then the counters could be reset. The router node could then update the activity factor for each link based on the associated active cycle count, and use that information to form link congestion information. In one example, the link congestion information could be maintained as one of a number of discrete levels. For example, a 2-bit congestion information indication could be maintained, allowing four possible congestion levels to be identified for each link.

With the above example, it could for instance be determined that if there are less than 32 active cycles in the 128 cycles that have been monitored, this indicates a lightly congested link, and hence the link congestion information could be given the value 00. Further, between 32 and 63 active cycles could result in a link congestion indication of 01, between 64 and 95 active cycles could result in a link congestion indication of 10, and greater than 95 active cycles could result in a link congestion indication of 11 (i.e. the highest level of congestion associated with a link). Alternatively, rather than merely replacing any existing value within a new value determined on the latest window of time observed, the existing levels for each link could be incremented or decremented when the observed congestion was higher or lower, respectively, than the previous level recorded for the link, so as to avoid reacting too quickly to changes in activity.

Figure 8B:
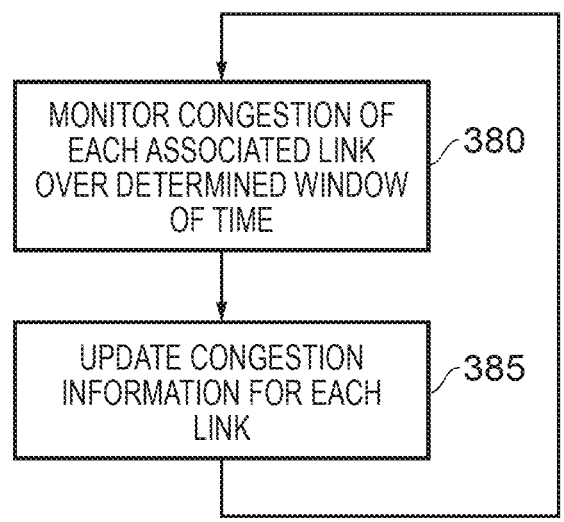
FIG. 8B is a flow diagram illustrating how that congestion information may be maintained by the router node in one example implementation.

Hence, as shown in FIG. 8B, in accordance with such a technique, at step 380 the congestion of each associated link is monitored over a determined window of time, and then at step 385 the congestion information for each link is updated, with the counters then being reset, after which the process returns to step 380.

Figure 9A:
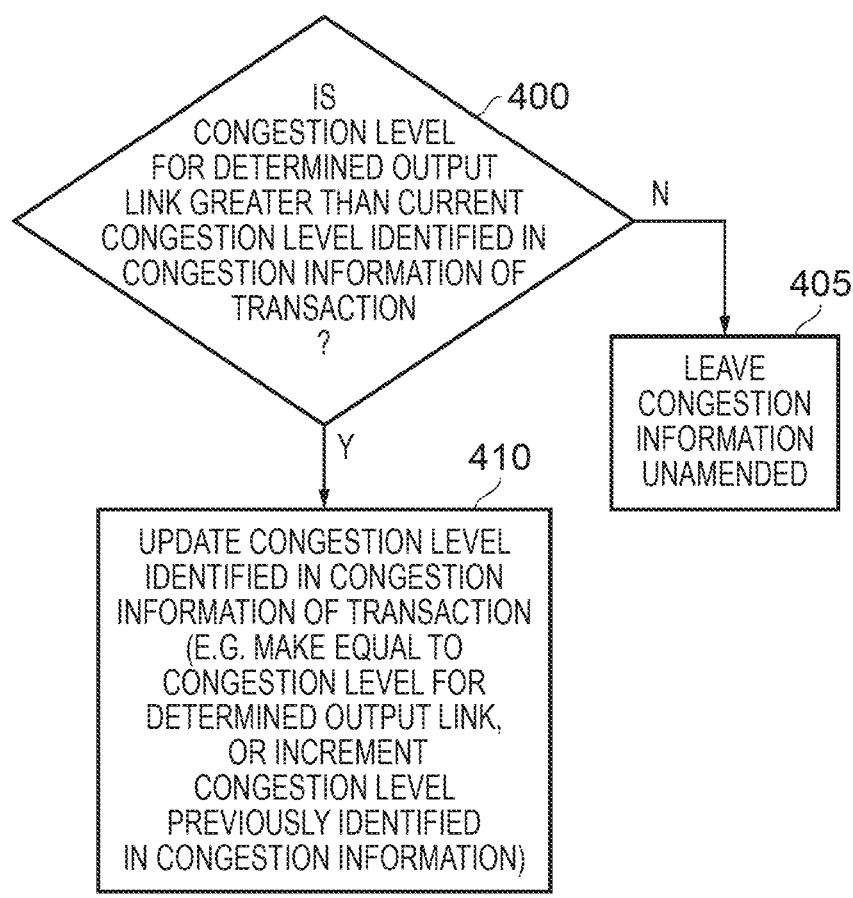
FIG. 9A is a flow diagram illustrating how congestion level information may be updated when employing the approach illustrated in FIG. 8A, in accordance with one example implementation.
Figure 9B:
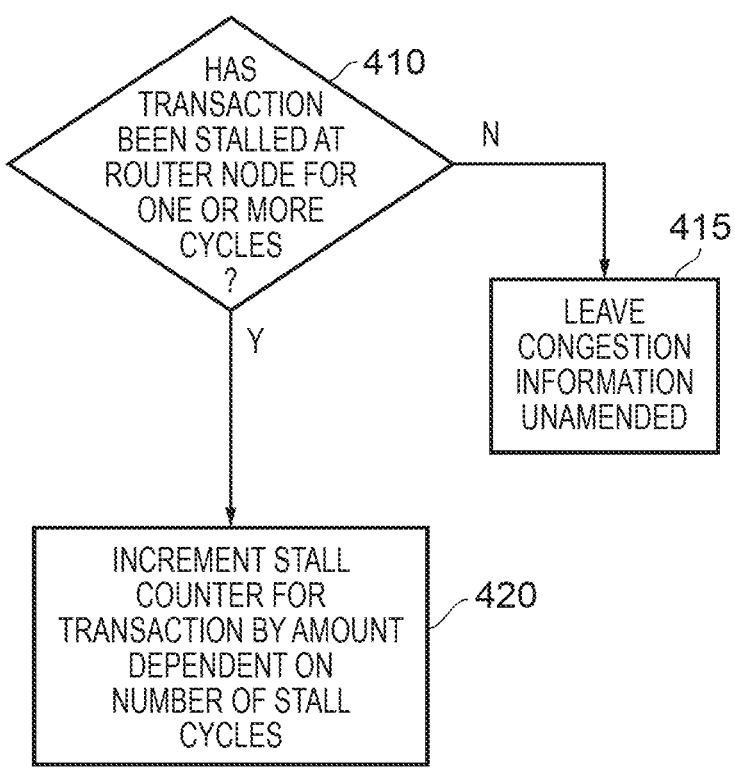
FIG. 9B is a flow diagram illustrating how congestion information can be updated in an alternative implementation where a stall counter is used as the congestion information.

FIG. 9A is a flow diagram illustrating how the update of the congestion information at step 335 of FIG. 7 may be implemented when adopting the earlier described approach of FIG. 8A and FIG. 8B. At step 400, it can be determined whether the congestion level for the determined output link is greater than the current congestion level identified in the congestion information of the transaction. If not, then the congestion information within the transaction can be left unamended at step 405. However, if the congestion level is greater, then the process can proceed to step 410 where the congestion level identified in the congestion information of the transaction can be updated. This can be done in a variety of ways. For example, the previous congestion level can merely be replaced with the congestion level determined for the output link, so that by the time the response for the transaction is received back at the requester, the indicated congestion information is indicative of the congestion level associated with the most congested link through which the transaction has passed. Alternatively, the previously identified congestion level could merely be incremented in such a situation, so as to avoid an overreaction to a single congested link.

Whilst such an approach can provide an efficient mechanism for maintaining a congestion level associated with a transaction as it is routed through the interconnect, it does require each router node to maintain link congestion information. In accordance with an alternative mechanism as schematically illustrated by the flow diagram of FIG. 9B, the requirement for the maintenance of such link congestion information may be avoided. In accordance with the technique shown in FIG. 9B, the updating of the congestion information at step 335 of FIG. 7 is performed through the maintenance of a stall counter. In particular, a stall counter can be associated with the transaction and updated as that transaction is routed through the interconnect to indicate the number of stall cycles observed by the transaction as it is passed through the interconnect. Hence, at step 410, the current router node at which the transaction is being handled can determine whether the transaction has been stalled at that router node for one or more cycles. If no stalling occurs, and hence the router outputs the transaction over the desired output link without any stall cycles, then at step 415 the congestion information can be left unamended. However, if there have been one or more stall cycles, then the stall counter associated with the transaction can be incremented by an amount dependent on the number of stall cycles at step 420.

In one example implementation, the stall counter may be implemented as a saturating counter, and hence will not roll over to a low value when it reaches its maximum count value. In accordance with the above described stall counter approach, the congestion tracking circuitry can be arranged in due course to extract the stall counter value from the response for a transaction, and then quantize that into one of the earlier described congestion levels in order to obtain an indicative congestion level for the route used by the transaction.

Figure 10:
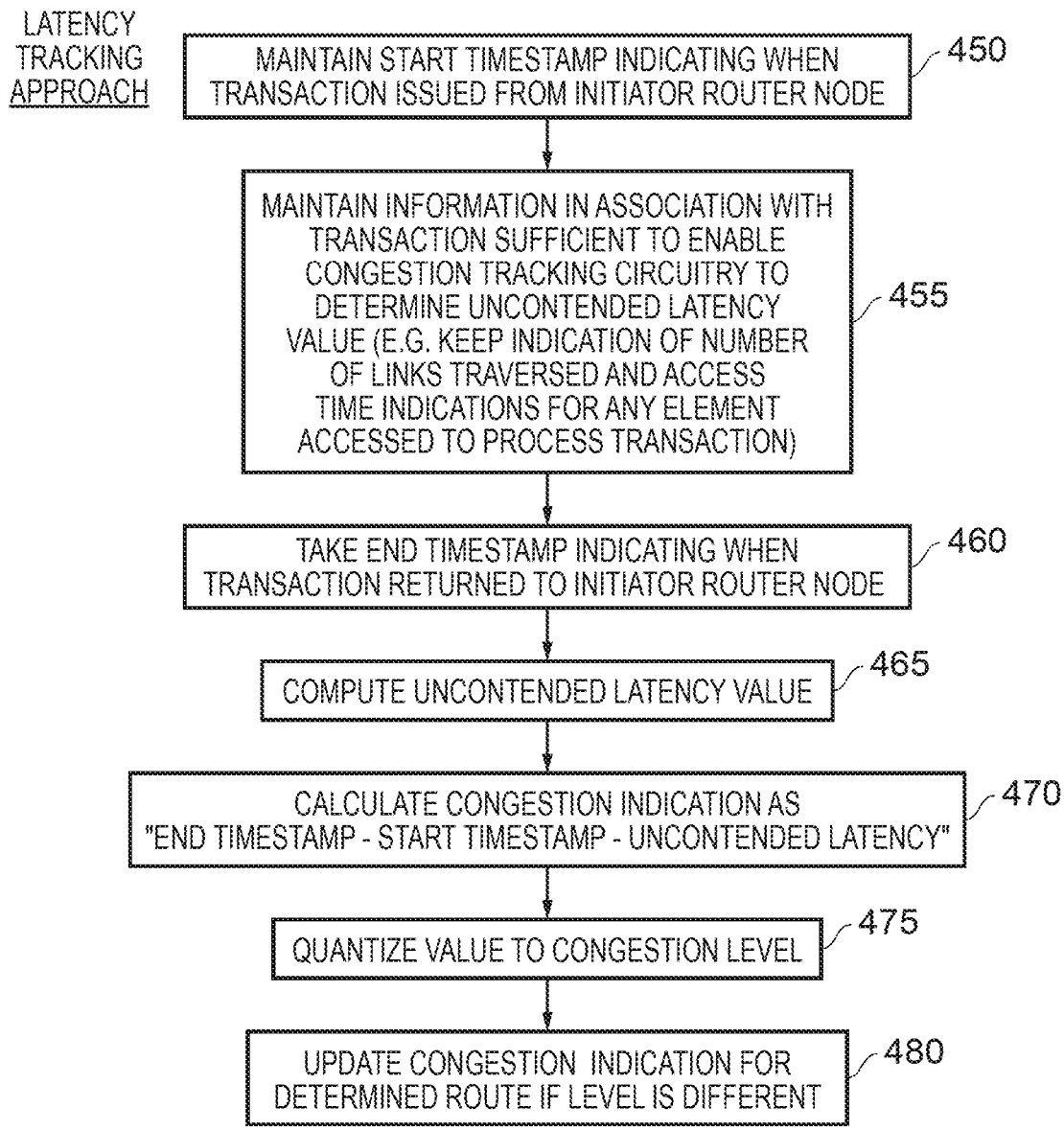
FIG. 10 is a flow diagram illustrating a latency tracking approach for determining congestion levels associated with various routes through the interconnect, in accordance with one example implementation.

FIG. 10 is a flow diagram illustrating a yet further alternative approach for tracking congestion information as a transaction is routed through the interconnect. At step 450, a start timestamp is maintained indicating when the transaction is issued from the initiator router node, i.e. the router node to which the requester element is connected. Then, as indicated by step 455, information is maintained in association with the transaction as it passes through the interconnect sufficient to enable the congestion tracking circuitry 75 in due course to determine an uncontended latency value. This hence provides a benchmark indication of the latency that would intrinsically be observed as a result of routing the transaction through the interconnect, against which the actual time taken for the transaction to be routed through the interconnect can be compared.

There are a number of pieces of information that could be maintained in order to provide sufficient information for the congestion tracking circuitry to determine the uncontended latency value. For example, an indication can be kept of the number of links traversed, and in addition some access time indication information can be kept in respect of any element accessed to process the transaction. For example, when the home node is accessed a hit or miss indication may be provided to identify whether there was a hit or a miss, and if the transaction is routed on to a memory controller, information about the access time associated with the memory access can be kept, such as whether there was a row buffer hit or a conflict, an indication of any memory controller queue delay, etc.

At step 460, an end timestamp can be obtained indicating when the transaction is returned to the initiator router node. At step 465, the uncontended latency value can then be computed by the congestion tracking circuitry based on the information maintained within the transaction. For example, the number of hops indicated can be multiplied by a known hop time, i.e. the time taken to traverse a link, and in addition information can be added indicative of the access time to the system cache, and the access time to memory if the transaction was indeed routed via memory.

At step 470, a congestion indication can then be calculated by subtracting the start timestamp from the end timestamp, and then subtracting the uncontended latency value. At step 475, that value can then be quantized to a congestion level, whereafter at step 480 the congestion indication for the determined route can then be updated if the computed congestion level at step 475 is different to the existing congestion level recorded for that route. It should be noted that since, in accordance with this technique, the value computed at step 470 is quantized into a congestion level, this means that the timestamps and other access parameters maintained as the transaction is routed through the interconnect do not need to be fully accurate, and can hence be optimised for lower cost.

Figure 11:
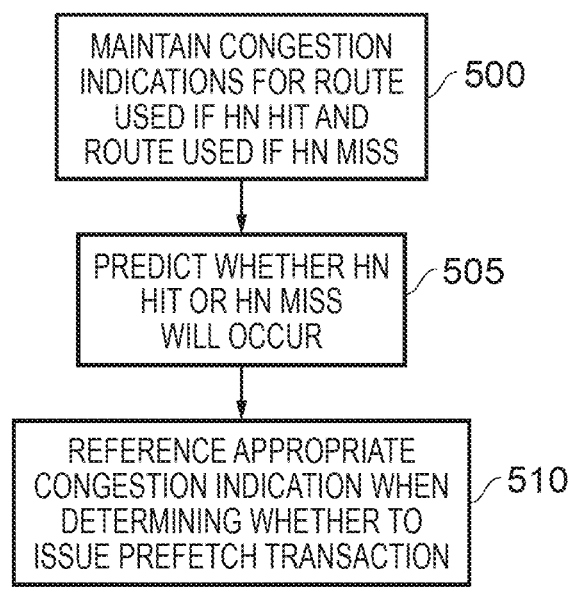
FIG. 11 is a flow diagram illustrating one approach that can be used to determine whether to issue a prefetch transaction, based on whether a hit or a miss is anticipated within the target completer element.

FIG. 11 schematically illustrates how the congestion tracking circuitry 75 can be arranged to keep separate congestion indications for different routes that may be employed, dependent on whether a cache hit or a cache miss occurs at a home node that is going to be used as the initial target completer element. In particular, at step 500 a congestion indication is maintained for the route that will be used if a transaction passed to a particular home node gives rise to a hit in the home node, and in addition a separate congestion indication is maintained for the alternative route that would occur if there was in fact a miss at the home node, and accordingly the transaction was forwarded on to a memory controller.

Then, at step 505, the prefetch throttling circuitry can be arranged to make a prediction as to whether a home node hit or a home node miss is expected, using any suitable mechanism for making such a prediction, and thereafter at step 510 can reference the appropriate congestion indication when determining whether to issue the prefetch transaction. For example, if it is known that the route that will employed if there is a home node hit is quite lightly congested, but the route that would be used if there is a home node miss is heavily congested, and it is determined that a miss is likely to occur, it could be decided by the prefetch throttling circuitry 80 to drop the prefetch transaction rather than propagate it through the interconnect.

Figure 12:
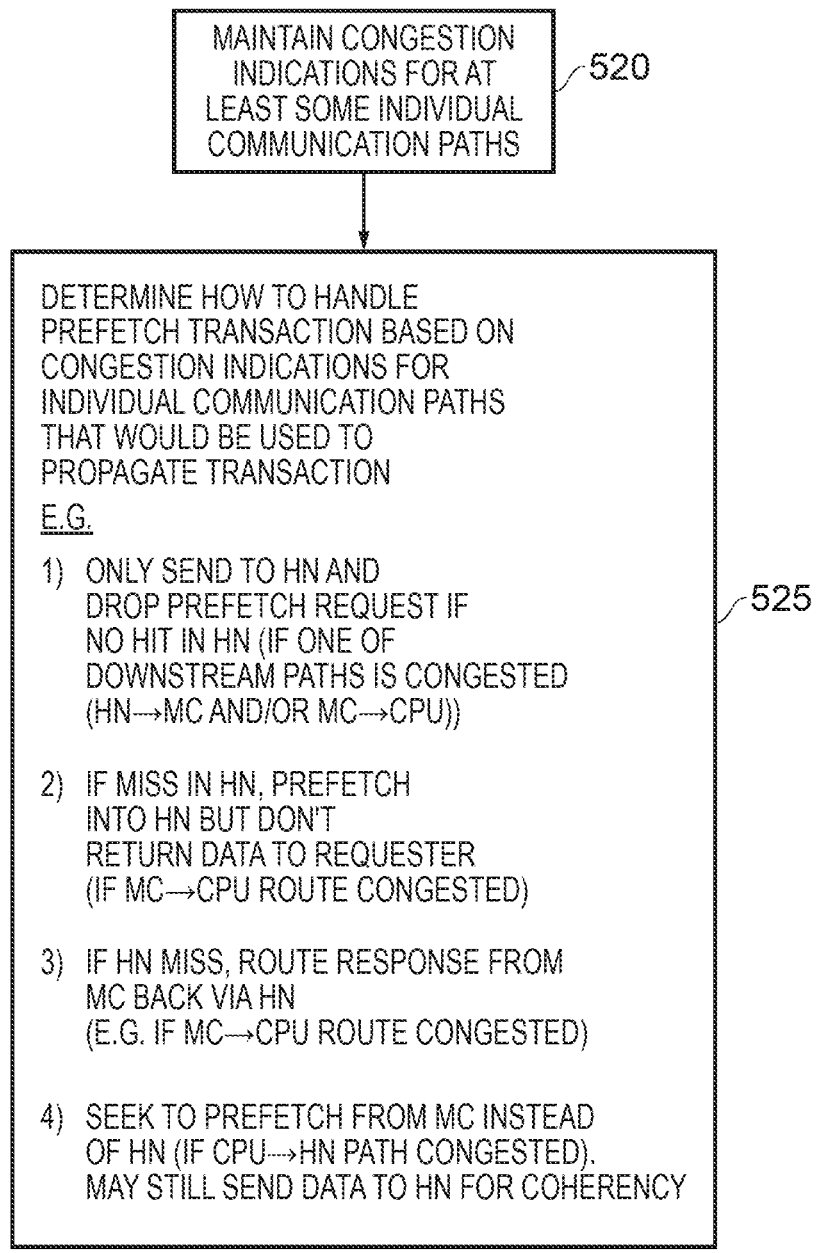
FIG. 12 is a flow diagram illustrating how the maintenance of congestion indications for at least some individual communication paths can be used when deciding how to handle a prefetch transaction, in accordance with certain example implementations.

FIG. 12 schematically illustrates how the prefetch throttling circuitry 80 may make decisions in respect of prefetch transactions in situations where the congestion tracking circuitry 75 maintains congestion indications for at least some individual communication paths within the interconnect, rather than solely for round trip routes. Hence, as indicated by step 520, the congestion tracking circuitry does maintain congestion indications for one or more individual communication paths, and then at step 525 the prefetch throttling circuitry determines how to handle the prefetch transaction it is currently considering based on the congestion indications for individual communication paths that would be used to propagate the transaction. Hence, if we consider the example where the requester element will propagate the transaction over a given communication path to a particular home node, and then if a hit occurs in the home node the home node will propagate a response over another given communication path back to the requester, whilst if instead there is a miss in the home node the transaction will be propagated on to a memory controller, and then from the memory controller back to the requester element, if there is congestion indication information maintained for one or more of these individual communication paths the prefetch throttling circuitry can tailor the decision it takes in respect of a prefetch transaction based on knowledge of the relative congestions on the different communication paths that could be used.

Various examples of how the prefetch throttling circuitry may tailor its decisions in such a way are illustrated in box 525 of FIG. 12. For example, the prefetch throttling circuitry may decide to only send the prefetch transaction to the home node, and to drop the prefetch transaction if there is no hit in the home node. This could be appropriate for example if one of the downstream communication paths is congested, for example the home node to memory controller path and/or the memory controller to requester path.

As another example, it may be decided to propagate the prefetch transaction to the home node, but with the transaction flagged such that if there is a miss in the home node, then the home node is arranged to contact the memory controller in order to prefetch the data into the home node, but without the data being returned to the requester. Such an approach could for example be used if the memory controller to requester communication path is congested.

As another example, if there is a miss in the home node, then the transaction could be flagged so that the response is routed from the memory controller back via the home node, rather than directly from the memory controller to the requester element. Again, this could be useful if the memory controller to requester path is congested.

As another example, the prefetch throttling circuitry could be arranged to seek to prefetch the data directly from the memory controller rather than via the appropriate home node, for example if it is known that the requester to home node path is congested. It should be noted that in some implementations there may still be a need for the data to be sent to the home node in order to ensure that the cache coherency protocol can be conformed to.

It will be appreciated that the above examples are merely illustrative of various options that could be taken, and that there are many other decisions that the prefetch throttling circuitry could take if it has access to congestion indications for individual communication paths.

Figure 13:
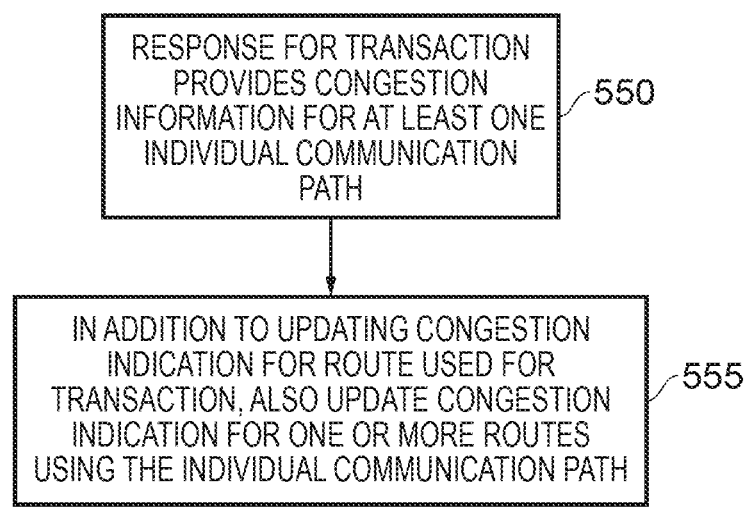
FIG. 13 is a flow diagram illustrating how congestion information that relates to an individual communication path may be used, when provided in a response, in order to update congestion indications, in accordance with one example implementation.

FIG. 13 is a flow diagram illustrating how the update process performed by the congestion tracking circuitry 75 could be modified if the response for a transaction provides congestion information for at least one individual communication path. In particular, step 550 detects when the response for a transaction provides such congestion information, and in that event at step 555 the congestion tracking circuitry not only updates the congestion indication for the route used by the transaction, but can also be arranged to detect other routes it is maintaining congestion indications for that also employ the individual communication path(s) for which the response has provided congestion information. In that event, it can hence use the individual communication path congestion information to additionally update the congestion indications for any such additional routes that also make use of the communication path(s) for which congestion information has been provided.

In one example implementation, individual completer elements may also be able to provide busyness indications indicative of how busy those completer elements are. These busyness indications can be derived in a variety of ways, but could for example be indicative of the occupancy of any transaction queues waiting to be processed by those completer elements. In such cases, the busyness indications can be combined in some suitable manner with the congestion indications for use when deciding whether to propagate or drop individual prefetch transactions.

Figure 14:
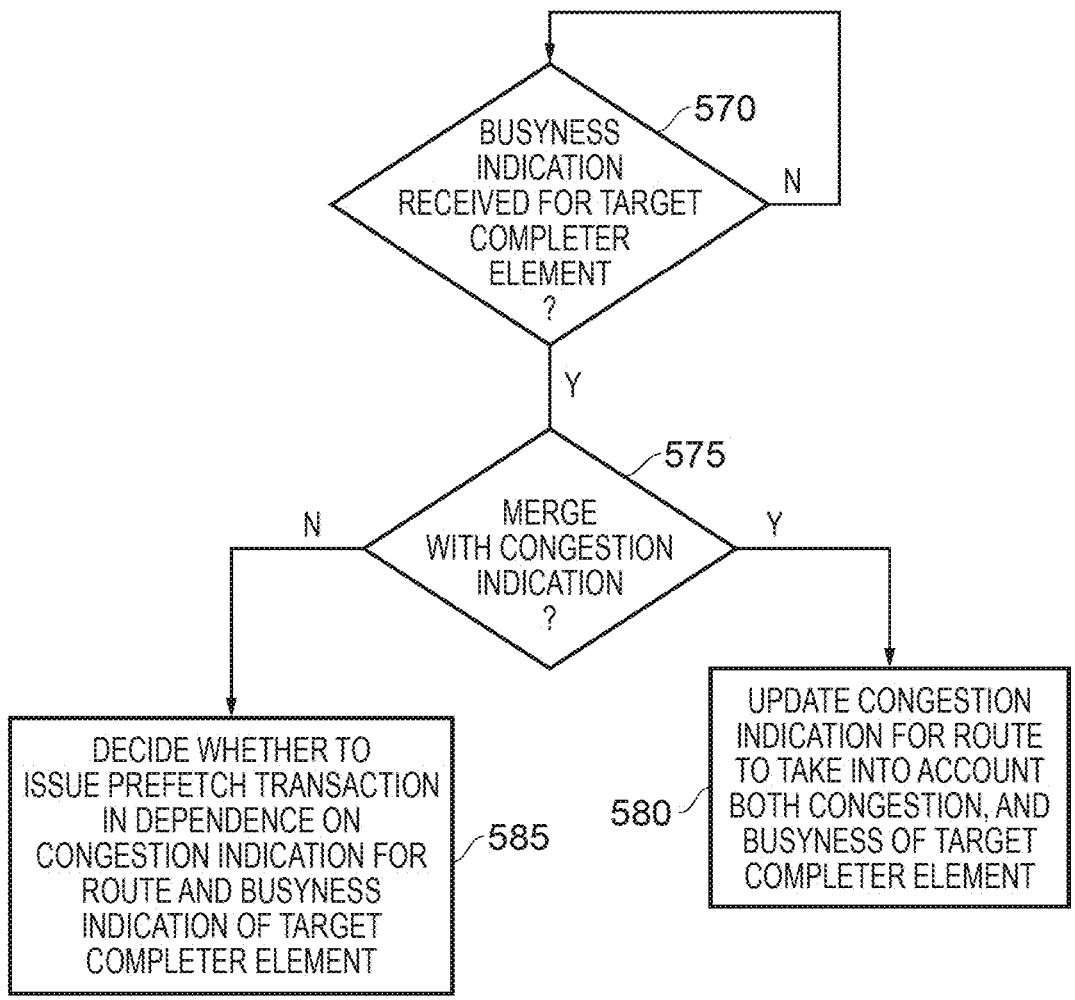
FIG. 14 is a flow diagram illustrating how a busyness indication can be used in combination with congestion indications, in accordance with one example implementation.

FIG. 14 schematically illustrates two alternative mechanisms that could be used. In particular, when at step 570 a busyness indication is received for a target completer element, then at step 575 it can be determined whether the congestion tracking circuitry 75 is operating in a mode where it will merge that busyness indication with the congestion indication for the route between the requester element and that target completer element. If so, then at step 580 the congestion indication for that route can be updated to take into account not only the congestion, but also the busyness of the target completer element. Purely by way of example, if the busyness indication was also expressed in levels, then the congestion tracking circuitry could be arranged to assess which of the congestion level and busyness level indicates the worse congestion measurement, and then update the congestion indication to reflect that worse level. In such an implementation, then the prefetch throttling circuitry can operate in the way discussed earlier, merely applying the congestion indication for the route when determining whether to propagate on a given prefetch transaction or instead reject that prefetch transaction.

However, in an alternative mode of operation, the congestion tracking circuitry 75 may be arranged not to merge busyness indications with the congestion indication, and instead the process may proceed to step 585 where the prefetch throttling circuitry 80 can instead incorporate the busyness indication into its decision process as to whether to issue a prefetch transaction. In particular, it can decide whether to issue the prefetch transaction in dependence on both the congestion indication obtained from the congestion tracking circuitry for the route that will be used, and the busyness indication obtained for the target completer element.

It will be appreciated that by such an approach the technique described herein is also able to adapt to variability in the load of individual completer elements, for example by allowing more prefetches to less loaded completer elements, whilst raising the confidence threshold required to enable prefetch transactions to be routed on to more highly loaded requester elements.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally, or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively, or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively, or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

It will be appreciated that the techniques described herein provide a mechanism for managing prefetch transactions from requester elements, so as to adaptively avoid over-subscribing bottlenecks in the interconnect. The technique described can leverage topology-aware dynamic confidence thresholding of prefetch transactions based on interconnect contention, to accelerate higher priority transactions whilst redistributing bandwidth to less contended routes, while maintaining the existing routing scheme (e.g. static routing) within the interconnect.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
an interconnect to provide communication paths between elements coupled to the interconnect;
wherein the elements coupled to the interconnect comprise at least a requester element to initiate transactions through the interconnect, and a plurality of completer elements each of which is arranged to respond to a transaction received by that completer element via the interconnect;
the apparatus further comprising:
congestion tracking circuitry to maintain, in association with the requester element, a congestion indication for each of a plurality of routes through the interconnect used to propagate transactions initiated by the requester element, where each route comprises one or more communication paths and the route employed to propagate a given transaction is dependent on a target completer element for that given transaction; and
prefetch throttling circuitry, responsive to an indication of a given prefetch transaction that the requester element wishes to initiate in order to speculatively retrieve data in anticipation of subsequent use of that data by the requester element, to identify the target completer element amongst the plurality of completer elements to which that given prefetch transaction would be issued, and to determine whether to issue the given prefetch transaction in dependence on the congestion indication for the route to be used to propagate that given prefetch transaction given the target completer element.

2. An apparatus as claimed in claim 1, wherein:
the requester element is arranged to provide a confidence indication in association with each prefetch transaction that the requester element wishes to initiate, the confidence indication being indicative of a likelihood of the data associated with that prefetch transaction subsequently being used by the requester element; and
the prefetch throttling circuitry is arranged to determine whether to issue the given prefetch transaction in dependence on both the congestion indication for the route to be used to propagate the given prefetch transaction, and the confidence indication associated with the given prefetch transaction.

3. An apparatus as claimed in claim 1, wherein the prefetch throttling circuitry is arranged, upon determining that the given prefetch transaction should not be issued, to issue a signal to the requester element to identify that the given prefetch transaction has been rejected.

4. An apparatus as claimed in claim 1, wherein the indication of the given prefetch transaction that the requester element wishes to initiate provides a memory address indication for the data, and the prefetch throttling circuitry is arranged to identify the target completer element based on the memory address indication.

5. An apparatus as claimed in claim 1, wherein the congestion tracking circuitry is arranged, on receipt of a response for a given transaction initiated by the requester element, to extract from the response congestion information pertaining to the route used for the given transaction, and to update the congestion indication for the route in dependence on the extracted congestion information.

6. An apparatus as claimed in claim 5, wherein at least the congestion indication identifies a congestion level from amongst a plurality of possible congestion levels.

7. An apparatus as claimed in claim 5, wherein the congestion information is provided by one of:
sideband signals that accompany the given transaction as it is routed through the interconnect, and that are arranged to be updated as the given transaction progresses through the interconnect so as to provide the congestion information as part of the response for the given transaction received by the congestion tracking circuitry;
one or more fields within the given transaction that are arranged to be updated as the given transaction progresses through the interconnect so as to provide the congestion information as part of the response for the given transaction received by the congestion tracking circuitry.

8. An apparatus as claimed in claim 7, wherein:
the interconnect comprises a plurality of router nodes interconnected by links, with the router nodes being arranged to provide connection points for connecting the elements to the interconnect;
the communication path used for communication from a first given element to a second given element passes from an initiator router node to which the first given element is connected to a recipient router node to which the second given element is connected via one or more links, with the number of links being dependent on the relative locations of the initiator router node and the recipient router node and whether there are any intervening router nodes between the initiator router node and the recipient router node along the communication path; and
each link may be shared by more than one communication path.

9. An apparatus as claimed in claim 8 wherein:
each router node maintains link congestion information for the links it is connected to, and is arranged to update the congestion information for a transaction passing through that router node taking into account the link congestion information for the link on which that transaction is output from that router node.

10. An apparatus as claimed in claim 9, wherein each router node maintains the link congestion information for the links taking into account link congestion observed over a determined window of time.

11. An apparatus as claimed in claim 8, wherein:
the congestion information comprises a stall cycle counter, and each router node is arranged to update the stall cycle counter for a transaction passing through that router node whenever the transaction is stalled at that router node awaiting availability of the link on which that transaction is to be output from that router node.

12. An apparatus as claimed in claim 8, wherein:
the congestion information for the given transaction is updated as the given transaction passes through the interconnect in order to provide to the congestion tracking circuitry sufficient information in the response to enable the congestion tracking circuitry to determine an uncontended latency value for the given transaction;
timestamp information is maintained to identify when the given transaction is issued onto the interconnect by the initiator router node and when the response for that given transaction is received back at the initiator router node; and
the congestion tracking circuitry is arranged to determine a round trip time for the given transaction using the timestamp information and determine the congestion indication by subtracting the uncontended latency value from the round trip time.

13. An apparatus as claimed in claim 12, wherein the sufficient information in the response used by the congestion tracking circuitry to determine the uncontended latency value identifies one or more of:
the number of links in a round trip route via which the given transaction is issued from, and returned to, the requester element;
an access time indication for any element accessed to process the transaction.

14. An apparatus as claimed in claim 5, wherein the plurality of routes comprise at least one of:
round trip routes through the interconnect via which a transaction is issued from, and returned to, the requester element, where each round trip route comprises multiple communication paths;
routes associated with individual communication paths within the interconnect over which a transaction may be propagated.

15. An apparatus as claimed in claim 14, wherein:
the target completer element is an intermediate element, and under at least one condition the target completer element is arranged to forward the given transaction to a further completer element for processing.

16. An apparatus as claimed in claim 15, wherein:
the congestion tracking circuitry is arranged to determine, from the response for the given transaction, whether the given transaction has been forwarded to the further completer element, and to interpret the congestion information in dependence on that determination.

17. An apparatus as claimed in claim 16, wherein the congestion tracking circuitry is arranged to maintain a congestion indication for both a first round trip route where the given transaction is processed by the target completer element, and a second round trip route where the given transaction is forwarded by the target completer element to the further completer element for processing.

18. An apparatus as claimed in claim 15, wherein:
the congestion tracking circuitry is further arranged to maintain additional congestion indications for at least one of:
a communication path from the requester element to the target completer element;

a communication path from the further completer element to the requester element; and a communication path from the target completer element to the further completer element; and the prefetch throttling circuitry is arranged to determine how to handle the given prefetch transaction that the requester element wishes to initiate, taking into account the congestion indication for the route between the requester element and the target completer element, and the additional congestion indications.

19. An apparatus as claimed in claim 14, wherein the congestion information in the response provides congestion information for at least one individual communication path, and the congestion tracking circuitry is arranged to update the congestion indication for one or more routes that incorporate that individual communication path.

20. An apparatus as claimed in claim 15, wherein the intermediate element forming the target completer element is arranged to provide a system cache for caching data associated with a chosen memory address range, and the further completer element is a memory controller used to control access to memory within at least a portion of the chosen memory address range.

21. An apparatus as claimed in claim 1, wherein:

the prefetch throttling circuitry is further arranged to receive a busyness indication for the target completer element, and is arranged to determine whether to issue the prefetch transaction in dependence on the congestion indication for the route to be used to propagate the given prefetch transaction, and the busyness indication.

22. An apparatus as claimed in claim 1, wherein:

the congestion tracking circuitry is further arranged to receive a busyness indication for the target completer element, and to adjust the congestion indication for the route to be used to propagate the given prefetch transaction to also take into account the busyness indication.

23. An apparatus as claimed in claim 1, further comprising interface circuitry providing an interface between the requester element and the interconnect, wherein at least one of the congestion tracking circuitry and the prefetch throttling circuitry is provided within the interface circuitry.

24. An apparatus as claimed in claim 23, wherein the requester element comprises a local cache storage and prefetch circuitry associated with the local cache storage, and the prefetch circuitry is arranged to issue to the interface circuitry the indication of the prefetch transaction that the requester element wishes to initiate.

25. An apparatus as claimed in claim 1, wherein:

at least one of the congestion tracking circuitry and the prefetch throttling circuitry is provided within the requester element.

26. A method of managing prefetch transactions, comprising:

providing communication paths between elements coupled to an interconnect, wherein the elements coupled to the interconnect comprise at least a requester element to initiate transactions through the interconnect, and a plurality of completer elements each of which is arranged to respond to a transaction received by that completer element via the interconnect;

maintaining, in association with the requester element, a congestion indication for each of a plurality of routes through the interconnect used to propagate transactions initiated by the requester element, where each route comprises one or more communication paths and the route employed to propagate a given transaction is dependent on a target completer element for that given transaction;

identifying, in response to an indication of a given prefetch transaction that the requester element wishes to initiate in order to speculatively retrieve data in anticipation of subsequent use of that data by the requester element, the target completer element amongst the plurality of completer elements to which that given prefetch transaction would be issued; and determining whether to issue the given prefetch transaction in dependence on the congestion indication for the route to be used to propagate that given prefetch transaction given the target completer element.

27. A non-transitory computer-readable medium to store computer-readable code for fabrication of an apparatus comprising:

an interconnect to provide communication paths between elements coupled to the interconnect, wherein the elements coupled to the interconnect comprise at least a requester element to initiate transactions through the interconnect, and a plurality of completer elements each of which is arranged to respond to a transaction received by that completer element via the interconnect;

congestion tracking circuitry to maintain, in association with the requester element, a congestion indication for each of a plurality of routes through the interconnect used to propagate transactions initiated by the requester element, where each route comprises one or more communication paths and the route employed to propagate a given transaction is dependent on a target completer element for that given transaction; and prefetch throttling circuitry, responsive to an indication of a given prefetch transaction that the requester element wishes to initiate in order to speculatively retrieve data in anticipation of subsequent use of that data by the requester element, to identify the target completer element amongst the plurality of completer elements to which that given prefetch transaction would be issued, and to determine whether to issue the given prefetch transaction in dependence on the congestion indication for the route to be used to propagate that given prefetch transaction given the target completer element.

* * * * *